United States Patent
Yoshizumi

(10) Patent No.: US 9,516,201 B2
(45) Date of Patent: Dec. 6, 2016

(54) IMAGING CONTROL APPARATUS, IMAGING CONTROL METHOD, AND PROGRAM

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 12/985,809

(22) Filed: Jan. 6, 2011

(65) Prior Publication Data

US 2011/0181687 A1 Jul. 28, 2011

(30) Foreign Application Priority Data

Jan. 26, 2010 (JP) ................. P2010-014228

(51) Int. Cl.
*H04N 5/225* (2006.01)
*H04N 5/232* (2006.01)

(52) U.S. Cl.
CPC ........ *H04N 5/2252* (2013.01); *H04N 5/23238* (2013.01)

(58) Field of Classification Search
USPC ................... 348/211.3, 369, 218.1
See application file for complete search history.

(56) References Cited

U.S. PATENT DOCUMENTS

| | | | |
|---|---|---|---|
| 5,687,249 A * | 11/1997 | Kato | G06T 7/0071 340/936 |
| 7,092,012 B2 * | 8/2006 | Nakamura et al. | 348/211.3 |
| 7,221,401 B2 * | 5/2007 | Hama et al. | 348/369 |
| 7,436,438 B2 * | 10/2008 | Sim et al. | 348/218.1 |
| 2006/0077262 A1 * | 4/2006 | Miyamaki et al. | 348/211.99 |
| 2006/0132604 A1 * | 6/2006 | Lao et al. | 348/148 |
| 2009/0103778 A1 | 4/2009 | Yoshizumi et al. | |
| 2010/0134639 A1 | 6/2010 | Takeuchi | |
| 2010/0134644 A1 * | 6/2010 | Kita | 348/222.1 |
| 2010/0177160 A1 * | 7/2010 | Tocher | G02B 13/06 348/36 |
| 2010/0295966 A1 * | 11/2010 | Furlan | 348/231.2 |
| 2011/0181690 A1 | 7/2011 | Yoshizumi | |
| 2011/0216159 A1 | 9/2011 | Yoshizumi | |
| 2011/0216225 A1 | 9/2011 | Yoshizumi | |
| 2012/0002075 A1 | 1/2012 | Yoshizumi et al. | |

FOREIGN PATENT DOCUMENTS

| | | |
|---|---|---|
| CN | 1954590 A | 4/2007 |
| CN | 1979335 A | 6/2007 |
| CN | 101046623 A | 10/2007 |
| CN | 101415077 A | 4/2009 |
| JP | 11-088754 | 3/1999 |
| JP | 11-088811 | 3/1999 |
| JP | 2005-333396 A | 12/2005 |
| JP | 2009-100300 A | 5/2009 |
| KR | 100736565 B1 | 6/2007 |
| WO | WO 2005/088961 A1 | 9/2005 |

OTHER PUBLICATIONS

Chinese Office Action issued Feb. 8, 2013 in connection with Chinese Application No. 201110025354.8 English translation thereof.
U.S. Appl. No. 13/008,110, filed Jan. 18, 2011, Yoshizumi.
U.S. Appl. No. 13/034,116, filed Feb. 24, 2011, Yoshizumi.
U.S. Appl. No. 13/037,638, filed Mar. 1, 2011, Yoshizumi.
U.S. Appl. No. 13/161,638, filed Jan. 16, 2011, Yoshizumi et al.

* cited by examiner

*Primary Examiner* — James M Anderson, II
(74) *Attorney, Agent, or Firm* — Chip Law Group

(57) ABSTRACT

An imaging control apparatus for an imaging apparatus or an imaging system, which includes an imaging unit imaging a subject and a variable mechanism varying an imaging visual field of the imaging unit, includes an automatic imaging mode control unit changing control setting between when automatic still image capturing is performed and when automatic panorama image capturing is performed.

17 Claims, 16 Drawing Sheets

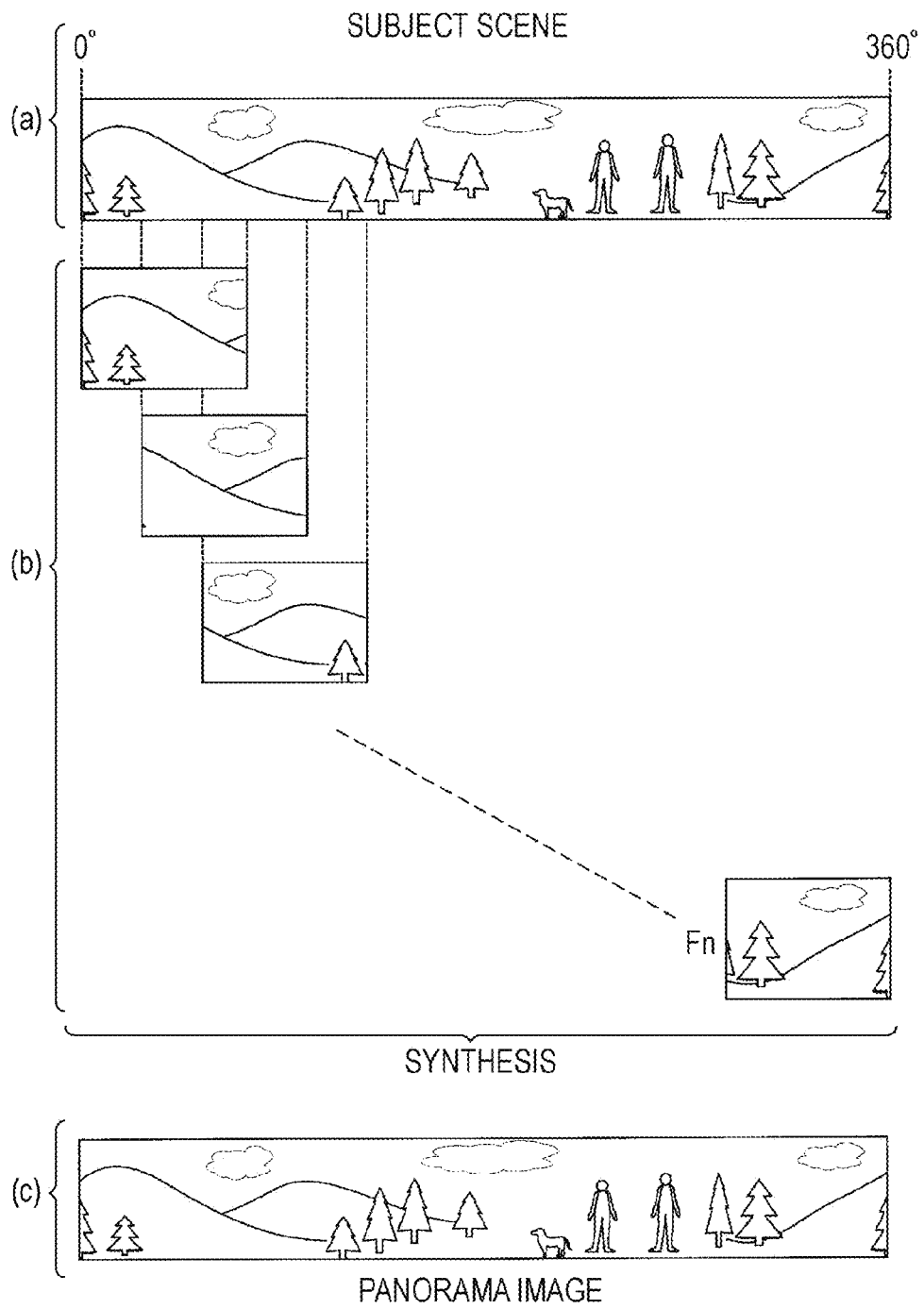

IMAGING CONTROL APPARATUS, IMAGING CONTROL METHOD, AND PROGRAM

CROSS REFERENCE TO RELATED APPLICATIONS

This application claims priority to Japanese Patent Application No. JP 2010-014228, filed Jan. 26, 2010, the contents of which is incorporated herein by reference in its entirety.

BACKGROUND OF THE INVENTION

1. Field of the Invention

The present invention relates to an imaging control device and an imaging control method for an imaging apparatus and an imaging system capable of capturing a still image or a panorama image by automatically varying an imaging visual field. The present invention also relates to a program capable of embodying the imaging control apparatus and the imaging control method.

2. Description of the Related Art

In the related art, so-called panorama image capturing is disclosed by which a still image of a wide angle scene is obtained when a user (cameraman) takes a photograph of the image while moving a camera in a substantially horizontal rotation direction. For example, Japanese Unexamined Patent Application Publication No. 11-88754, Japanese Unexamined Patent Application Publication No. 11-88811, and Japanese Unexamined Patent Application Publication No. 2005-333396 disclose the techniques regarding the panorama image capturing.

When performing imaging with a digital still camera in a panorama image capturing mode, a user moves the camera in the substantially horizontal rotation direction. At this time, the digital still camera acquires many pieces of still image data and synthesizes the still images at the joins of subject scene to generate panorama image data as a horizontally long still image.

By the panorama image capturing, a wide-angle scene which may not be obtained in normal image capturing can be obtained as one still image.

In the related art, a system performing automatic imaging without a release operation of a user is disclosed.

For example, Japanese Unexamined Patent Application Publication No. 2009-100300 discloses a technique in which automatic composition adjustment and automatic recording of captured images obtained by the automatic composition adjustment are performed by an imaging system including a digital still camera and a pan/tilt head electrically varying the digital still camera in a pan/tilt direction.

In the technique disclosed in Japanese Unexamined Patent Application Publication No. 2009-100300, a search is made for the subject as a person using, for example, a face detection technique. Specifically, the subject (face of a person) viewed within an image frame is detected while the pan/tilt head rotates the digital still camera in a pan direction.

When the subject within the image frame is detected as the result of the search for the subject, the composition considered to be optimum for the detected form (for example, the number, position, or size of the subject) of the subject within the image frame upon detecting the subject is determined (optimum composition determination). That is, the angles of the pan, tilt, and zoom considered to be optimum are calculated.

When the angles of the pan, tilt, and zoom considered to be optimum are calculated by the optimum composition determination, the angles of the pan, tilt, and zoom are adjusted as target angles (composition adjustment).

After the composition adjustment is completed, the captured image is automatically recorded.

According to the automatic imaging process of the automatic composition adjustment (automatic captured-image recording), the captured image can be recorded automatically with the composition considered to be optimum without any imaging operation performed by the user.

SUMMARY OF THE INVENTION

When the panorama image capturing can be performed in the automatic imaging process in addition to normal still image capturing, the imaging apparatus may be suitably used in various forms.

In control settings of the automatic still image capturing, however, it is assumed that performing the panorama image capturing is not appropriate in some cases.

It is desirable to provide a technique capable of appropriately performing both automatic still image capturing and automatic panorama image capturing.

According to an embodiment of the invention, there is provided an imaging control apparatus for an imaging apparatus or an imaging system which includes an imaging unit imaging a subject and a variable mechanism varying an imaging visual field of the imaging unit. The imaging control apparatus includes an automatic imaging mode control unit changing control setting between when automatic still image capturing is performed and when automatic panorama image capturing is performed.

The imaging control apparatus may further includes an imaging visual field variable control unit driving and controlling the variable mechanism of the imaging visual field; an automatic still image capturing control unit detecting the subject while allowing the imaging visual field variable control unit to vary the imaging visual field and allowing the imaging apparatus to capture a still image automatically; and an automatic panorama image capturing control unit allowing the imaging apparatus to acquire a plurality of image data used to generate panorama image data by the imaging, while allowing the imaging visual field variable control unit to vary the imaging visual field.

The automatic imaging mode control unit may change the control setting of the variable mechanism of the imaging visual field controlled by the imaging visual field variable control unit between when the automatic still image capturing is performed and when the automatic panorama image capturing is performed.

For example, the imaging visual field variable control unit may control a panning mechanism associated with the imaging apparatus and serving as the variable mechanism of the imaging visual field. The automatic imaging mode control unit may change setting of a panning speed of the panning mechanism between when the automatic still image capturing is performed and when the automatic panorama image capturing is performed.

For example, the imaging visual field variable control unit may control a tilting mechanism associated with the imaging apparatus and serving as the variable mechanism of the imaging visual field. The automatic imaging mode control unit may change setting of the maximum tilt angle of the tilting mechanism between when the automatic still image capturing is performed and when the automatic panorama image capturing is performed.

The automatic imaging mode control unit may change setting of a condition of a subject detection process and/or a composition process between when the automatic still image capturing is performed and when the automatic panorama image capturing is performed.

The automatic imaging mode control unit may change setting of a condition of release timing between when the automatic still image capturing is performed and when the automatic panorama image capturing is performed.

According to another embodiment of the invention, there is provided an imaging control method for an imaging apparatus or an imaging system which includes an imaging unit imaging a subject and a variable mechanism varying an imaging visual field of the imaging unit. The imaging control method includes: allowing the imaging apparatus or the imaging system to perform an imaging process in an automatic still image capturing mode for detecting the subject while the variable mechanism varies the imaging visual field and automatically capturing a still image, and an imaging process in an automatic panorama image capturing mode for acquiring a plurality of image data used to generate panorama image data by the imaging while the variable mechanism varies the imaging visual field; and changing control setting between when performing the imaging process of the automatic still image capturing mode and when performing the imaging process of the automatic panorama image capturing mode.

According to still another embodiment of the invention, there is provided a program processing control of an imaging apparatus or an imaging system. The program causes an arithmetic processing unit to execute the above imaging control method.

According to the embodiments of the invention, the automatic still image capturing of automatically capturing a normal still image and the automatic panorama image capturing of automatically capturing a panorama image are executed as the automatic imaging process on the imaging apparatus or the imaging system.

In this case, the control setting (for example, a parameter or a processing algorithm) is changed between when the automatic still image capturing is performed and when the automatic panorama image capturing is performed. For example, setting of a panning speed, the maximum tilt angle, a condition of the subject detection process or the composition process, or a condition of the release timing for automatic release is changed.

Thus, appropriate automatic imaging is executed in both the automatic still image capturing and the automatic panorama image capturing.

According to the embodiments of the invention, the imaging process is performed for each appropriate parameter or algorithm in both the automatic still image capturing and the automatic panorama image capturing as the automatic imaging process. Therefore, it is possible to obtain the advantage of obtaining high-quality still images and panorama images by the automatic imaging.

BRIEF DESCRIPTION OF THE DRAWINGS

FIG. 10 is a diagram illustrating panorama image capturing according to the embodiment.

DESCRIPTION OF THE PREFERRED EMBODIMENTS

Figure 1A:
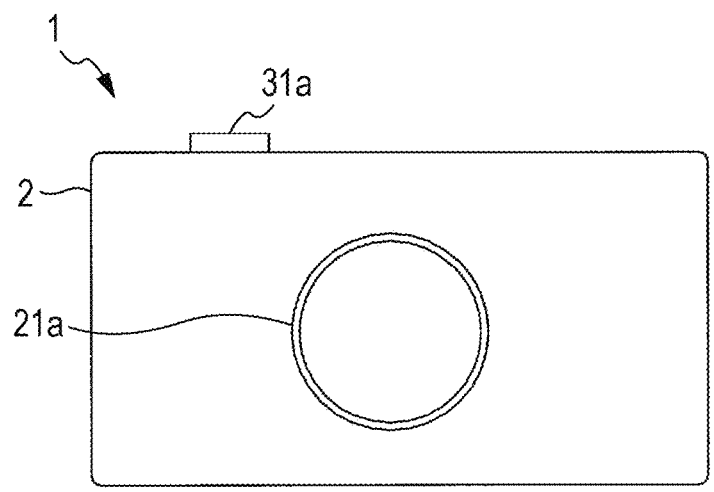
FIGS. 1A and 1B are a front view and a rear view illustrating a digital still camera according to an embodiment of the invention, respectively.

Hereinafter, embodiments of the invention will be described in the following sequence. In the embodiments, an imaging system including a digital still camera and a pan/tilt head capable of mounting the digital still camera will be described as an example. A single digital still camera can, of course, capture an image, but an automatic imaging process can be performed by the imaging system in combination with the pan/tilt head.

1. Configuration of Imaging System
1-1. General Configuration
1-2. Digital Still Camera
1-3. Pan/tilt Head
2. Exemplary Function Configuration
3. Panorama Image Capturing
4. First Exemplary Automatic Imaging Process
5. Second Exemplary Automatic Imaging Process
6. Another Exemplary Function Configuration
7. Program In the specification, an "image frame", an "image angle", an "imaging visual field", and a "composition" used in description are defined as follows.

The "image frame" refers to an area range corresponding to one image plane viewed, for example, just as an image is inserted, and generally has a vertically long outer line form or a horizontally long outer line form.

The "image angle", which is also referred to as a zoom angle, is obtained by expressing a range, which falls within the image frame determined according to the position of a zoom lens of an optical system of an imaging apparatus, by an angle. In general, the image angle is determined according to a size between the focal distance of an imaging optical system and an image plane (an image sensor or a film). However, an element which can be varied in response to a focal distance is referred to as the image angle.

The "imaging visual field" indicates a visual field of the imaging optical system. That is, the imaging visual field is a range which falls within the image frame of an imaging target in the surrounding scene of the imaging apparatus. The imaging visual field is determined by a swing angle in a pan (horizontal) direction and an angular degree (an elevation angle and a depression angle) in a tilt (vertical) direction as well as the image angle.

The "composition", which is also referred to as framing, is a disposition state after the inclusion of the setting of the size of a subject falling within the image frame determined by, for example, the imaging visual field.

1. Configuration of Imaging System 1-1. General Configuration

An imaging system according to an embodiment includes a digital still camera 1 and a pan/tilt head 10 on which the digital still camera 1 is detachably mounted.

In the pan/tilt head 10, the orientation of pan/tilt directions of the digital still camera 1 is electrically varied. Then, automatic composition adjustment and automatic recording of a captured image obtained by the automatic composition adjustment are performed.

For example, a search is performed for a subject as a person is searched using a face detection technology. Specifically, the subject (the face of a person) viewed within the image frame is detected while the digital still camera 1 is rotated, for example, in the pan direction by the pan/tilt head 10.

When the subject is detected within the image frame as the result of the search for the subject, the composition considered to be optimum for the detected form (for example, the number, position, or size of the subject) of the subject within the image frame upon detecting the subject is determined (optimum composition determination). That is, the angles of the pan, tilt, and zoom considered to be optimum are calculated.

When the angles of the pan, tilt, and zoom considered to be optimum are calculated by the optimum composition determination, the angles of the pan, tilt, and zoom are adjusted as target angles (composition adjustment).

After the composition adjustment is completed, the captured image is automatically recorded.

According to the automatic imaging process of the automatic composition adjustment (automatic captured-image recording), the captured image can be recorded automatically using the composition considered to be optimum without any imaging operation performed by the user.

Figure 1B:
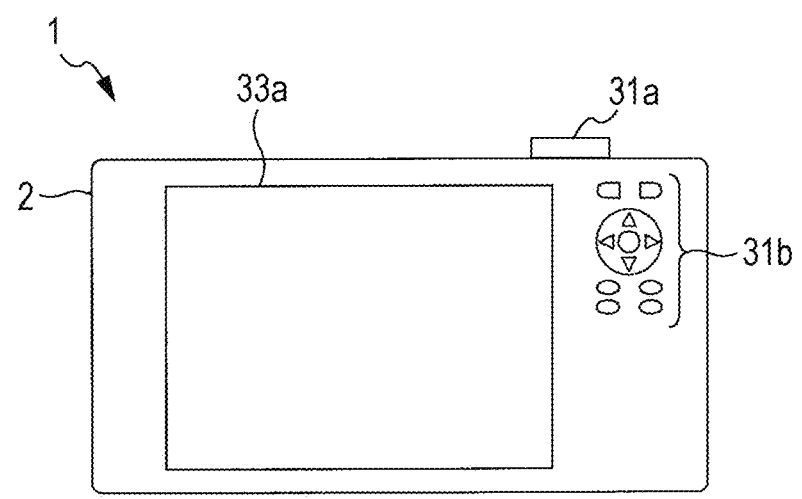

In FIGS. 1A and 1B, an example of the appearance of the digital still camera 1 is shown. FIGS. 1A and 1B are front and rear views illustrating the digital still camera 1, respectively.

As shown in FIG. 1A, the digital still camera 1 includes a lens unit 21a on the front surface of a main body 2 thereof. As an optical system capturing an image, the lens unit 21a is formed in the outside of the main body 2.

A release button 31a is installed on the upper surface of the main body 2. In an image capturing mode, an image (captured image) captured by the lens unit 21a is generated as an image signal. In the image capturing mode, captured-image data of each frame can be obtained at a predetermined frame rate by an image sensor described below.

When the release button 31a is operated (release operation/shutter operation), the captured image (frame image) is recorded as image data of a still image at this timing in a recording medium. That is, capturing the still image, which is generally called photography, is performed.

As shown in FIG. 1B, the digital still camera 1 includes a display screen unit 33a on the rear surface thereof.

In the image capturing mode, an image captured by the lens unit 21a is displayed as a through image on the display screen unit 33a. The through image is a moving image based on each frame image obtained by the image sensor and is an image displayed as the subject is displayed at that time.

In a reproduction mode, the image data recorded in the recording medium is reproduced and displayed.

The operated image is displayed as a GUI (Graphical User Interface) in response to the operation performed with the digital still camera 1 by the user.

By combining a touch panel with the display screen unit 33a, a necessary operation can be performed when the user touches on the display screen unit 33a with his fingers on the display screen unit 33a.

The digital still camera 1 includes an operator 31b such as various keys and a dial as well as the release button 31a.

Operation keys, an operation dial, or the like for a zoom operation, mode selection, a menu operation, a cursor operation on a menu, a reproduction operation, and the like can be exemplified.

Figure 2:
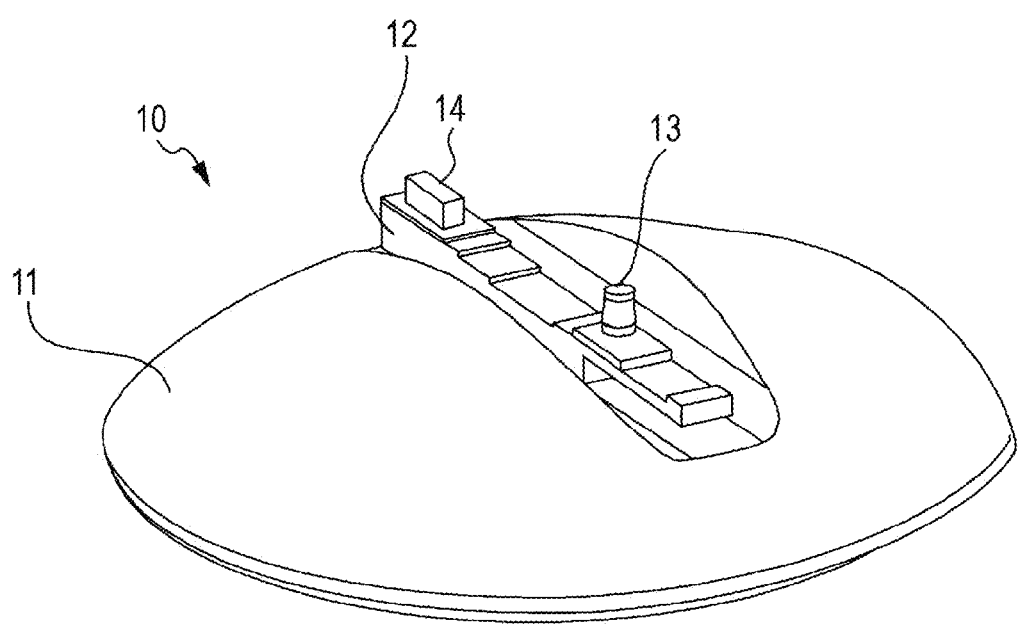
FIG. 2 is a perspective view illustrating a pan/tilt head on which the digital still camera is mounted according to the embodiment.
Figure 3:
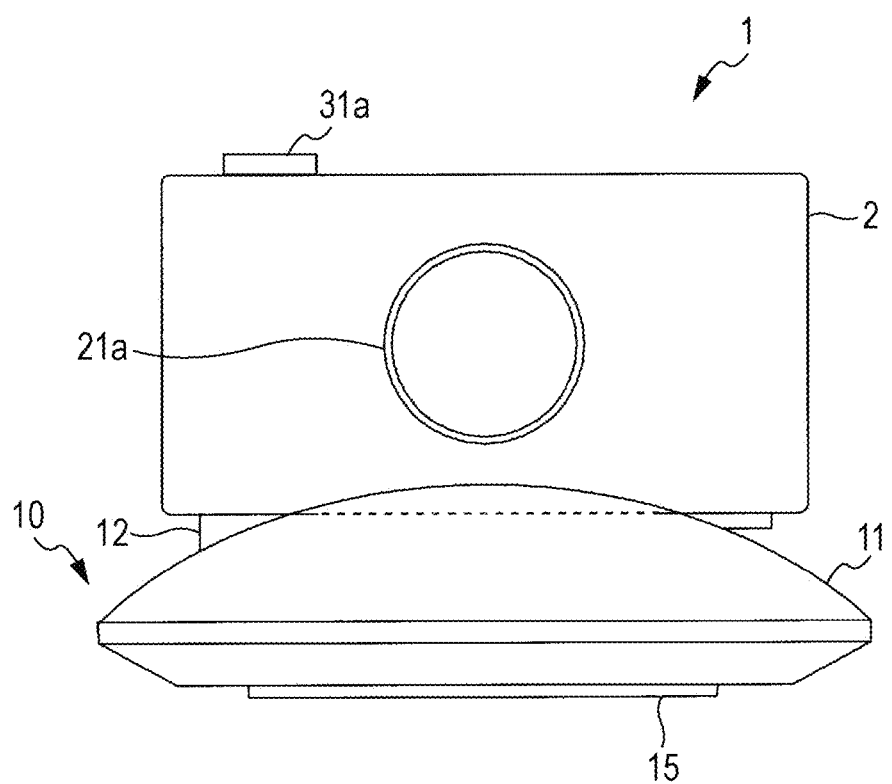
FIG. 3 is a front view illustrating the pan/tilt head mounted with the digital still camera according to the embodiment.
Figure 4:
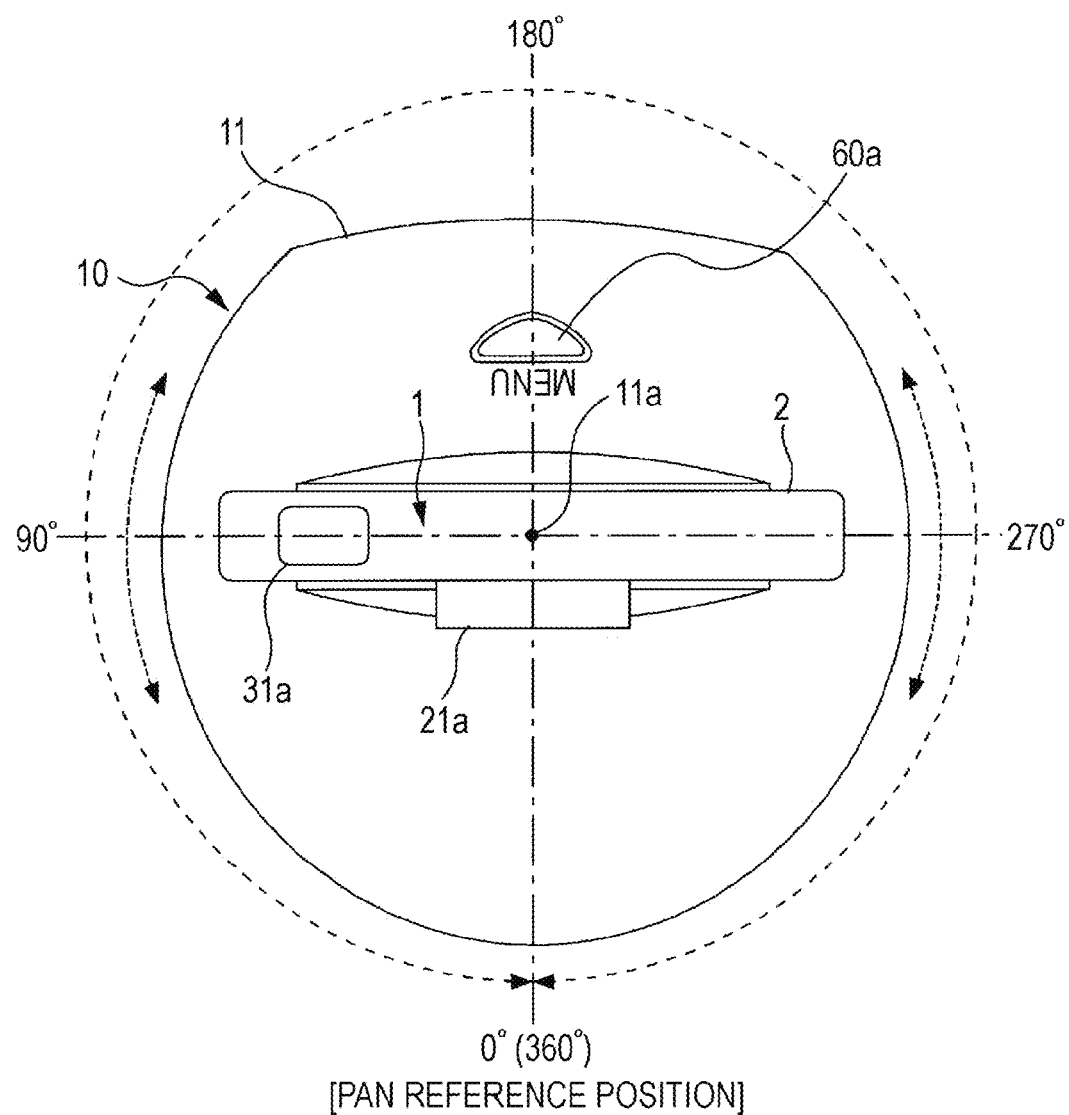
FIG. 4 is a diagram illustrating movement in a pan direction when the digital still camera is mounted on the pan/tilt head according to the embodiment.
Figure 5A:
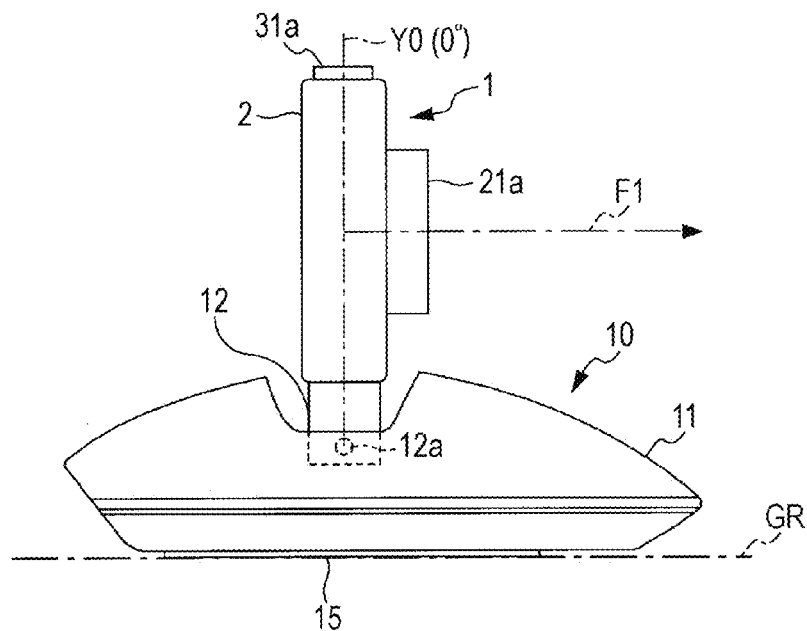
FIGS. 5A and 5B are diagrams illustrating movement in a tilt direction when the digital still camera is mounted on the pan/tilt head according to the embodiment.
Figure 5B:
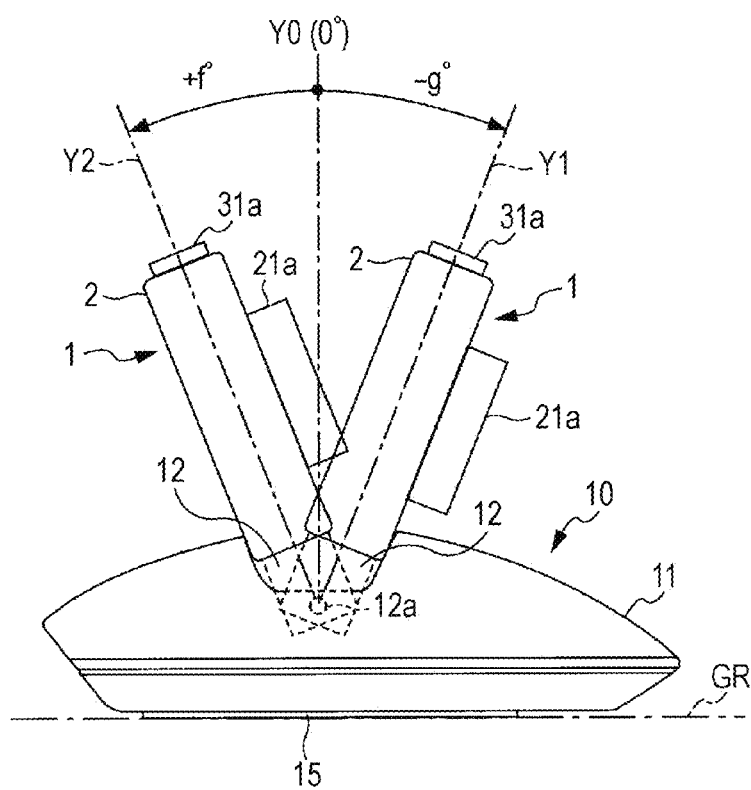

FIG. 2 is a perspective view illustrating the appearance of the pan/tilt head 10. In FIG. 3 to FIG. 5B, the state where the digital still camera 1 is appropriately placed on the pan/tilt head 10 is shown. FIG. 3 is a front view, FIG. 4 is a plan view, and FIGS. 5A and 5B are side views (in particular, FIG. 5B is a side view illustrating the movement range of a tilt mechanism).

As FIGS. 2, 3, 4, 5A, and 5B are shown, the pan/tilt head 10 has a structure in which a main body 11 is combined on a large grounding base 15 and a camera pedestal unit 12 is mounted on the main body 11.

When the digital still camera 1 is mounted on the pan/tilt head 10, the bottom surface of the digital still camera 1 is placed on the top surface of the camera pedestal unit 12.

As shown in FIG. 2, a protrusion portion 13 and a connector 14 are formed on the top surface of the camera pedestal unit 12. Although not shown, a hole portion engaging with the protrusion portion 13 is formed on the lower surface of the main body 2 of the digital still camera 1. When the digital still camera 1 is appropriately placed on the camera pedestal unit 12, the hole portion and the protrusion portion 13 engage with each other. In the engagement state, it is assumed that the digital still camera 1 is not deviated from the pan/tilt head 10 in normal panning and tilting processes of the pan/tilt head 10.

A connector is also formed at a predetermined position of the bottom surface of the digital still camera 1. When the digital still camera 1 is appropriately mounted on the camera pedestal unit 12, as described above, the connector of the digital still camera 1 is connected to the connector 14 of the pan/tilt head 10 so that at least the both are communicable with each other.

For example, the connector 14 and the protrusion portion 13 are actually configured so that the position thereof shifts (moves) relative to the camera pedestal unit 12 within a given range. Moreover, for example, when an adapter or the like suitable for the shape of the bottom surface of the digital still camera 1 is concurrently used, another kind of digital still camera is configured to be mounted on the camera pedestal unit 12 so as to communicate with the pan/tilt head 10.

Next, basic movement of the digital still camera 1 by the pan/tilt head 10 in the pan and tilt directions will be described.

First, the basic movement in the pan direction is as follows.

That is, the bottom surface of the grounding base 15 is grounded in the state where the pan/tilt head 10 is put on the surface of a table, a floor, or the like. In this state, as shown in FIG. 4, the main body 11 is configured to rotate clockwise or counterclockwise about a rotational axis 11a which is a rotational center. That is, when the main body 11 rotates, the imaging visual field can be varied in a horizontal direction (right and left directions) of the digital still camera 1 mounted on the pan/tilt head 10 (so-called panning).

In this case, a pan mechanism of the pan/tilt head 10 is configured so as to rotate by 360° or more clockwise or counterclockwise without limitation.

A reference position in the pan direction is set for the pan mechanism of the pan/tilt head 10.

Here, as shown in FIG. 4, a pan reference position is set to be 0° (360°) and the rotation position of the main body 11 in the pan direction, that is, the pan position (pan angle) is set to be within a range from 0° to 360°.

The basic movement of the pan/tilt head 10 in the tilt direction is as follows.

That is, as shown in FIGS. 5A and 5B, the movement in the tilt direction is achieved by swinging the camera pedestal unit 12 about a rotational axis 12a serving as a rotational center at an angle in both directions of the elevation angle and the depression angle.

As shown in FIG. 5A, the camera pedestal unit 12 is located at a tilt reference position Y0 (0°). In this state, an imaging direction F1 identical with the imaging optical axis of the lens unit 21a (optical system) is parallel to a grounding surface GR on which the grounding base 15 is grounded.

As shown in FIG. 5B, the camera pedestal unit 12 can move about the rotational axis 12a serving as the rotational center in the direction of the elevation angle within the range from the tilt reference position Y0 (0°) to the predetermined maximum rotation angle +f°. The camera pedestal unit 12 can also move the rotational axis 12a serving as the rotational center in the direction of the depression angle within the range from the tilt reference position Y0 (0°) to the predetermined maximum rotation angle −g°.

Thus, by moving the camera pedestal unit 12 within the range from the maximum rotation angle +f° to the maximum rotation angle −g° with reference to the tilt reference position Y0 0°), the imaging visual field can be varied in the tilt direction (upper and lower directions) of the digital still camera 1 mounted on the pan/tilt head 10 (the camera pedestal unit 12). That is, the tilting process can be achieved.

Figure 6:
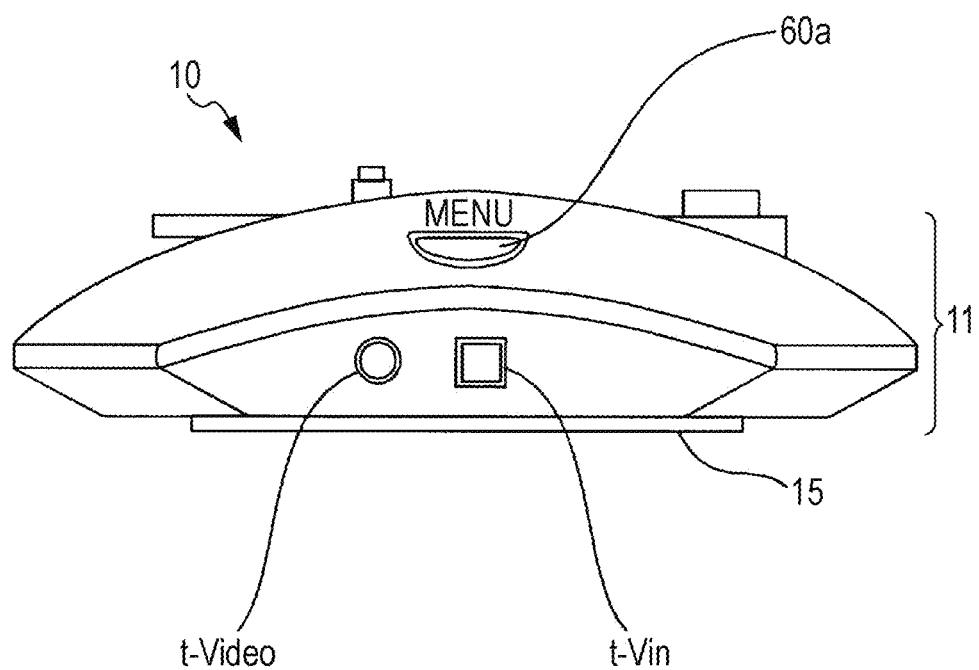
FIG. 6 is a rear view illustrating the pan/tilt head according to the embodiment.

FIG. 6 is a rear view illustrating the pan/tilt head 10.

As shown in FIG. 6, the pan/tilt head 10 has a power terminal t-Vin detachably connecting a power cable and a video terminal t-Video detachably connecting a video cable on the rear surface of the main body 11.

The pan/tilt head 10 is configured to charge the digital still camera 1 by supplying power input via the power terminal t-Vin to the digital still camera 1 mounted on the above-described camera pedestal unit 12.

That is, the pan/tilt head 10 of this example functions as a cradle (dock) charging the digital still camera 1.

In this example, when an image signal based on, for example, a captured image is transmitted from the digital still camera 1, the pan/tilt head 10 is configured to output the image signal to the outside via the video terminal t-Video.

As shown in FIGS. 4 and 6, a menu button 60a is installed on the rear surface of the main body 11 of the pan/tilt head 10. By operating the menu button 60a, for example, a menu is displayed on the display screen unit 33a of the digital still camera 1 by communication between the pan/tilt head 10 and the digital still camera 1. When the menu is displayed, the user can operate a necessary operation.

1-2. Digital Still Camera

Figure 7:
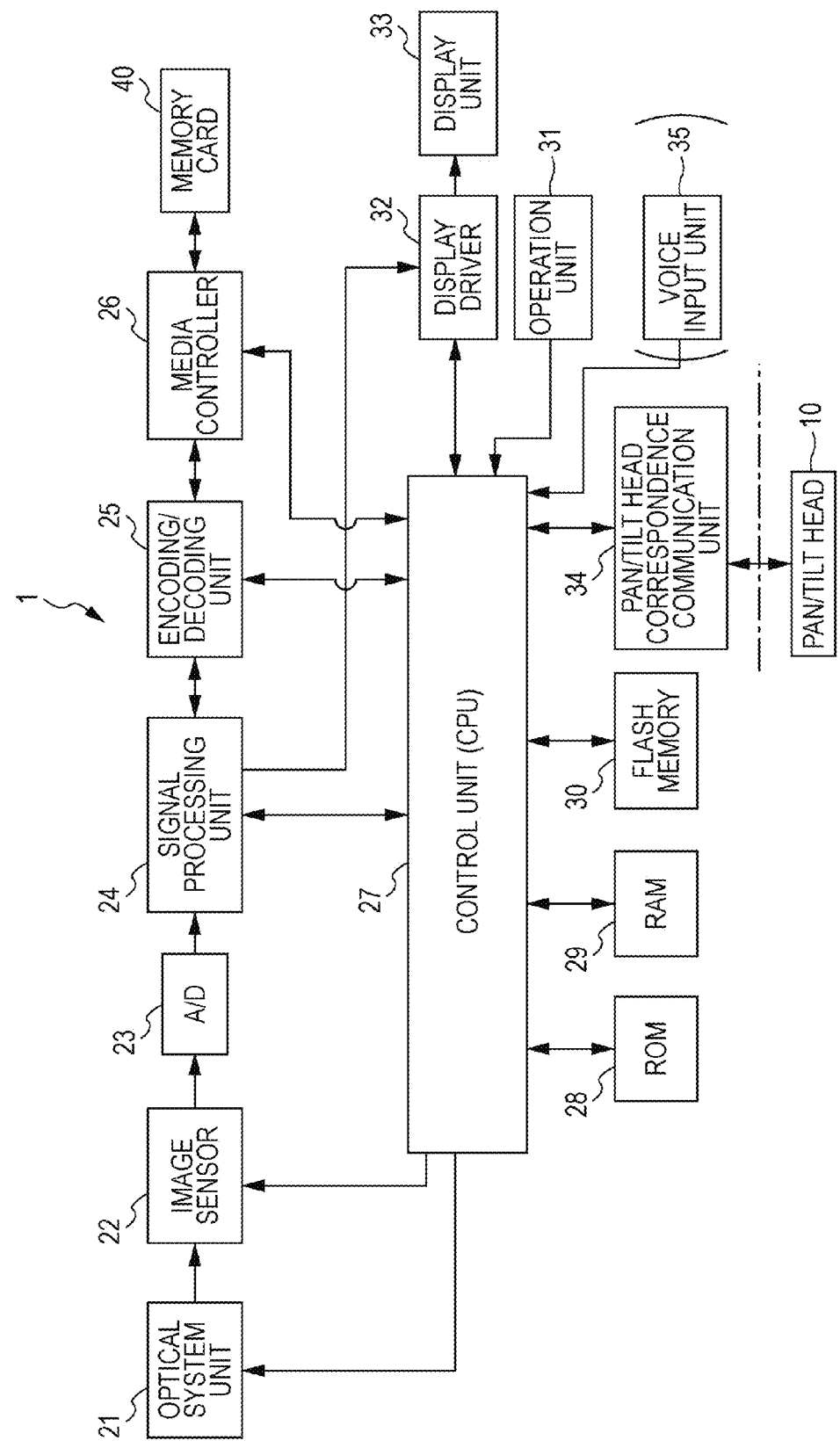
FIG. 7 is a block diagram illustrating an exemplary internal configuration of the digital still camera according to the embodiment.

FIG. 7 is a block diagram illustrating an exemplary internal configuration of the digital still camera 1.

The optical system unit 21 includes a diaphragm and a lens group with the predetermined number of imaging lenses including a zoom lens and a focus lens. The optical system unit 21 forms an image on a light-receiving surface of the image sensor 22 using incident light as imaging light.

The optical system unit 21 may include a driving mechanism to drive the zoom lens, the focus lens, the diaphragm, and the like. The process of the driving mechanism is controlled by so-called camera control such as zoom (image angle) control, automatic focus adjustment control, and automatic exposure control performed by, for example, a control unit 27.

The image sensor 22 performs so-called photoelectric conversion to convert imaging light obtained from the optical system unit 21 into an electric signal. Therefore, the image sensor 22 receives the imaging light from the optical system unit 21 on the light-receiving surface of a photoelectric conversion element and sequentially outputs signal charges accumulated in response to the strength of the received light at a predetermined timing. Thus, the electric signal (imaging signal) corresponding to the imaging light is output.

The photoelectric conversion element (imaging element) used as the image sensor 22 is not particularly limited. In this situation, however, a CMOS (Complementary Metal Oxide Semiconductor) sensor, a CCD (Charge Coupled Device), or the like may be used. When the CMOS sensor is used, a configuration also including an analog-digital converter corresponding to an A/D converter 23 described below may be used as a device (component) corresponding to the image sensor 22.

When the imaging signal output from the image sensor 22 is input to the A/D converter 23, the imaging signal is converted into a digital signal and is input to a signal processing unit 24.

The signal processing unit 24 is configured by, for example, a DSP (Digital Signal Processor) and performs predetermined signal processing on the digital imaging signal output from the A/D converter 23 according to a program.

The signal processing unit 24 acquires the digital imaging signal output from the A/D converter 23 by unit corresponding to one still image (frame image). The signal processing unit 24 generates captured-image data (captured still image data), which is image signal data corresponding to one still image, by performing predetermined signal processing on the imaging signal of the acquired still image unit.

In some cases, the signal processing unit 24 performs an image analysis process for performing a subject detection process or a composition process described below using the captured-image data acquired in this manner.

In a panorama image capturing mode, the signal processing unit 24 also performs a process of synthesizing many frame images obtained in panorama image capturing and generates panorama image data.

When the captured-image data generated by the signal processing unit 24 is recorded in a memory card 40 serving as a recording medium, the captured-image data corresponding to, for example, one still image is output from the signal processing unit 24 to the encoding/decoding unit 25.

The encoding/decoding unit 25 performs compression encoding on the captured-image data of the still image unit output from the signal processing unit 24 according to a predetermined still image compression encoding scheme, and performs conversion into a format of the image data compressed according to a predetermined format by adding a header or the like under the control of the control unit 27, for example. Then, the image data generated in this manner is transmitted to the media controller 26.

The media controller 26 writes and records the transmitted image data in the memory card 40 under the control of the control unit 27. In this case, the memory card 40 is a recording medium which has an outer appearance of a card form in conformity to a predetermined standard, for example, and has a non-volatile semiconductor storage element such as a flash memory therein.

The recording medium recording the image data may be a recording medium of another kind or form other than the memory card. For example, various recording media such as an optical disk, a hard disk, a semiconductor memory chip such as a flash memory chip mounted in a non-detachable manner, and a holographic memory may be used.

The digital still camera 1 can display a so-called through image, which is an image currently being captured, by displaying the image on the display unit 33 using the captured-image data obtained from the signal processing unit 24.

For example, the signal processing unit 24 generates the captured-image data corresponding to one still image by importing the imaging signal output from the A/D converter 23, as described above, and sequentially generates the captured-image data corresponding to a frame image in a moving image by repeatedly generating the captured-image data. Then, the sequentially generated captured-image data are transmitted to the display driver 32 under the control of the control unit 27.

The display driver 32 generates driving signals to drive the display unit 33 based on the captured-image data input from the signal processing unit 24, as described above, and outputs the driving signals to the display unit 33. Accordingly, the images based on the captured-image data of the still image unit are sequentially displayed on the display unit 33.

In terms of a user's view, the captured images are displayed on the display unit 33 just as a moving image is displayed. That is, the trough image is displayed.

The digital still camera 1 can reproduce the image data recorded in the memory card 40 and display the images on the display unit 33.

Therefore, the control unit 27 designates the image data and instructs the media controller 26 to read data from the memory card 40. In response to this command, the media controller 26 gains access to the address where the designated image data is recorded on the memory card 40, reads the image data, and transmits the read image data to the encoding/decoding unit 25.

The encoding/decoding unit 25 starts extracting the substantial data as the compressed still image data from the captured-image data transmitted from the media controller 26 under the control of the control unit 27, for example, and performs a decoding process for the compression encoding on the compressed still image data to obtain the captured-image data corresponding to one still image. The captured-image data is transmitted to the display driver 32. Thus, the images of the captured-image data recorded in the memory card 40 are reproduced and displayed on the display unit 33.

Not only the through image or the reproduced images of the image data but also a user interface image (operated image) can be displayed on the display unit 33.

In this case, a display image data serving as the user interface image necessary in the control unit 27 is generated, for example, according to the process state, and the display image data is output to the display driver 32. Thus, the user interface image is displayed on the display unit 33.

The user interface image can be displayed on the display screen of the display unit 33 independent of a monitor image such as a specific menu screen or the reproduced image of the captured-image data. Therefore, the user interface image can be displayed in a superimposed or synthesized manner on the monitor image or the reproduced image of the captured-image data.

The control unit 27 includes a CPU (Central Processing Unit), and thus forms a microcomputer together with a ROM 28, a RAM 29, and the like.

The ROM 28 stores programs to be executed by the CPU, for example, serving as the control unit 27 and various kinds of setting information associated with the process of the digital still camera 1.

The RAM 29 is a main memory unit for the CPU.

In this case, the flash memory 30 is used as a non-volatile storage area used to store various kinds of setting information and the like necessary to be modified (rewritten) according to the operation of the user, a process history, or the like.

When a non-volatile memory, for example, a flash memory is used in the ROM 28, a partial storage area of the ROM 28 may be used instead of the flash memory 30.

In this embodiment, the control unit 27 performs various processes for automatic imaging. First, the control unit 27 performs, as a subject detection process, a process of detecting a subject from each frame image obtained by the signal processing unit 24 while varying the imaging visual field (or allowing the signal processing unit 24 to perform the process) and searching for a surrounding subject from the digital still camera 1.

As the composition process, the control unit 27 performs optimum composition determination of determining the composition considered to be optimum for the form of the subject detected in the subject detection process according to a predetermined algorithm and composition adjustment of setting the composition considered to be optimum by the optimum composition determination as a target composition. After the imaging preparation process, the control unit 27 performs control processes to record the captured-images automatically.

The control unit 27 performs a panorama image capturing process, that is, gives an instruction to perform capturing many frame images as panorama image capturing or to perform a synthesis process or performs a process such as parameter setting in the panorama image capturing mode. The control unit 27 also controls the pan/tilt head 10 to rotatably move the pan/tilt head 10 in a substantially horizontal direction for the panorama image capturing.

This control process will be described below.

The operation unit 31 collectively refers to various operators equipped with the digital still camera 1 and an operation information signal output unit which generates operation information signals in response to the operation performed in the operator and outputs the operation information signals to the control unit 27.

Examples of the operator include the release button 31*a* and the various operators 31*b* (such as a power button, a mode button, a zoom operation button, and an operation dial) shown in FIGS. 1A and 1B.

When the display unit 33 is formed as a touch panel, the touch sensor unit may be a specific example of the operation unit 31.

Moreover, a reception unit receiving a command signal from a remote controller is an example of the operation unit 31.

The control unit 27 performs a predetermined process in response to the operation information signal input from the operation unit 31. Thus, the process of the digital still camera 1 is implemented according to the operation of the user.

A pan/tilt head correspondence communication unit 34 is a unit which executes communication according to a predetermined communication scheme between the pan/tilt head 10 and the digital still camera 1.

For example, when the digital still camera 1 is mounted on the pan/tilt head 10, the pan/tilt head correspondence communication unit 34 has a physical layer configuration in which communication signals can be transmitted to and received from a communication unit of the pan/tilt head 10 and a configuration in which a communication process corresponding to a predetermined upper layer of the physical layer is implemented. In the physical layer configuration, a connector unit connected to the connector 14 is included in correspondence to the configuration of FIG. 2.

Both a terminal exchanging the communication signals and a terminal transmitting charging power are installed in each connector to enable charging on the side of the pan/tilt head 10. Although not illustrated, a batter mounting unit detachably mounting a battery is installed in the digital still camera 1. Therefore, the battery mounted in the battery mounting unit is charged with electricity based on the power transmitted from the pan/tilt head 10.

In some cases, a voice input unit 35 is installed in the digital still camera 1. The voice input unit 35 is used to detect the input of a specific language voice, a specific sound (for example, clapping sound), or the like as trigger input at the start of an automatic imaging process described below or as trigger input at the start of automatic panorama image capturing.

The voice input unit 35 is also installed to determine the input of a specific language voice or a specific sound as the decision of release timing.

The voice input unit 35 includes a voice signal processing circuit including a microphone and a microphone amplifier and a voice analysis unit determining a specific sound. The voice analysis may be executed by the control unit 27.

The digital still camera 1 may have a configuration having no recording function in a recording medium such as the memory card 40. For example, imaging data may not be recorded in the internal recording medium, but may be output and displayed on an external device or may be recorded in an external device.

In this case, a transmission unit transmitting the imaging data to the external device may be provided as a configuration example, instead of the media controller 26. That is, the imaging apparatus is an apparatus which outputs the image data as a normal still image or a panorama image to the outside.

1-3. Pan/Tilt Head

Figure 8:
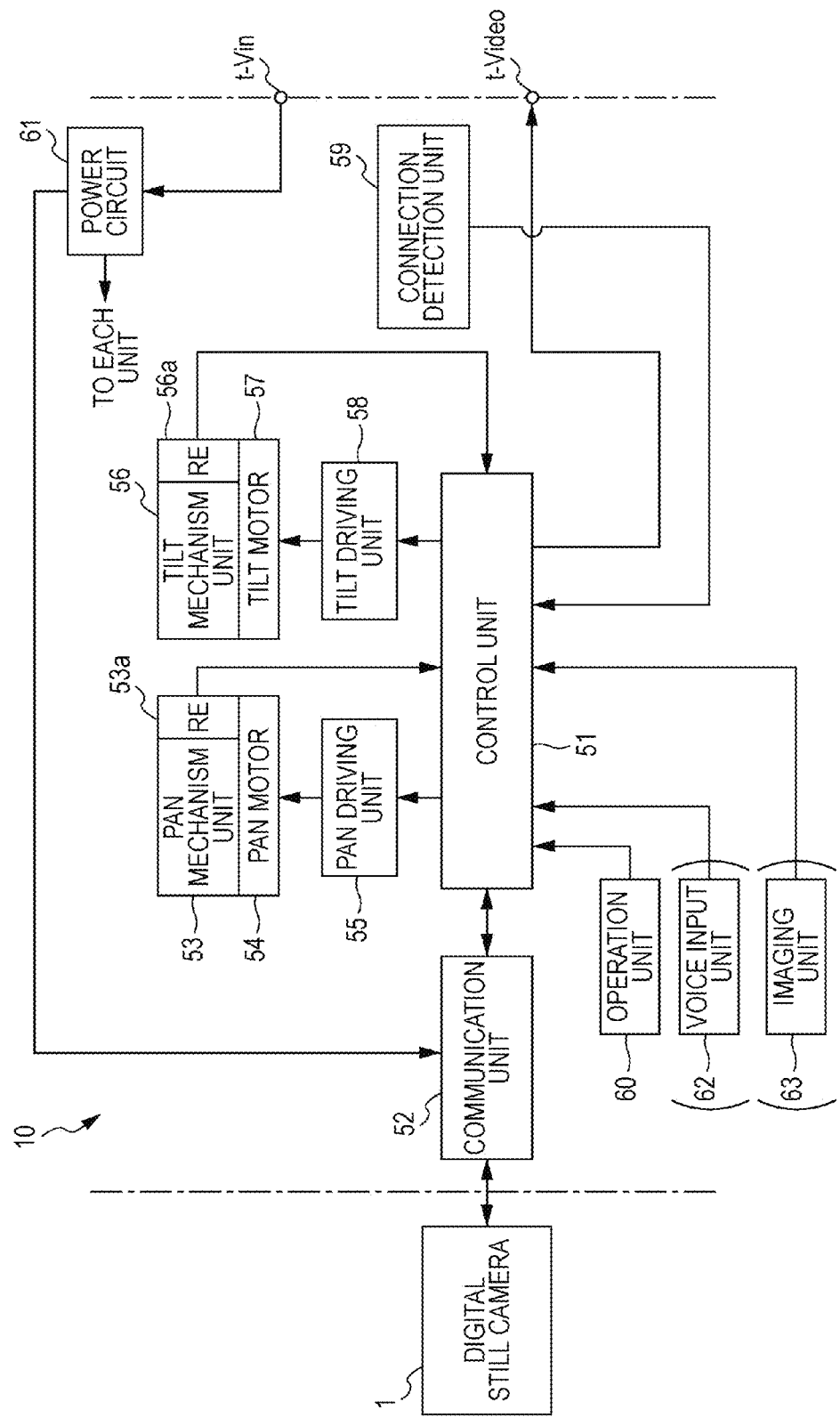
FIG. 8 is a block diagram illustrating an exemplary internal configuration of the pan/tilt head according to the embodiment.

FIG. 8 is a block diagram illustrating an exemplary internal configuration of the pan/tilt head 10.

As described above with reference to FIG. 6, the power terminal t-Vin and the video terminal t-Video are installed in the pan/tilt head 10.

The power input via the power terminal t-Vin is supplied as process power necessary for each unit of the pan/tilt head 10 via a power circuit 61. Charging power for the digital still camera 1 is generated for the power circuit 61 and the charging power is supplied to the digital still camera 1 via a communication unit 52 (connector).

A video signal transmitted from the digital still camera 1 is supplied to the video terminal t-Video via the communication unit 52 and a control unit 51.

Here, the process power of each unit of the pan/tilt head 10 is supplied via the power terminal t-Vin. However, in effect, a mounting unit of a battery is installed in the pan/tilt head 10 so that the process power of each unit can be supplied from the battery mounted on the mounting unit.

A connection detection unit 59 detecting whether cables to the power terminal t-Vin and the video terminal t-Video are connected is installed in the pan/tilt head 10. As a specific configuration of a detection mechanism detecting whether the cable is connected, a configuration or the like in which a switch turns ON/OFF in response to the connection/non-connection of the cables is exemplified. However, the specific configuration of the connection detection unit 59 is not particularly limited as long as the connection detection unit 59 is configured so that detection signals used to identify the connection/non-connection of the cables are output.

The detection signals (a detection signal for the power terminal t-Vin and a detection signal for the video terminal t-Video) by the connection detection unit 59 are supplied to the control unit 51.

The pan/tilt head 10 includes pan and tilt mechanisms, as described above. As the units corresponding to the pan and tilt mechanisms, a pan mechanism unit 53, a pan motor 54, a tilt mechanism unit 56, and a tilt motor 57 are shown in FIG. 8.

The pan mechanism unit 53 includes a mechanism which allows the digital still camera 1 mounted on the pan/tilt head 10 to move in the pan (horizontal/right and left) direction shown in FIG. 4. The movement of the mechanism can be implemented by rotation of the pan motor 54 in a forward or backward direction.

Likewise, the tilt mechanism unit 56 includes a mechanism which allows the digital still camera 1 mounted on the pan/tilt head 10 to move in the tilt (vertical/upper and lower) direction shown in FIGS. 5A and 5B. The movement of the mechanism can be implemented by rotation of the tilt motor 57 in a forward or backward direction.

The control unit 51 accomplished by a microcomputer formed in combination with a CPU, a ROM, a RAM, and the like controls the movements of the pan mechanism unit 53 and the tilt mechanism unit 56.

For example, when the control unit 51 controls the movement of the pan mechanism unit 53, the control unit 51 outputs a signal for instructing a movement direction and a movement speed to the pan driving unit 55. The pan driving unit 55 generates a motor driving signal corresponding to the input signal and outputs the motor driving signal to the pan motor 54. The motor driving signal is a pulse signal corresponding to PWM control, for example, when the motor is a step motor.

The pan motor 54 rotates, for example, in a necessary rotation direction and at a necessary rotation speed in response to the motor driving signal. As a consequence, the pan mechanism unit 53 is also driven to be moved in the movement direction corresponding to the necessary rotation direction and at the movement speed corresponding to the necessary rotation speed.

Likewise, when the control unit 51 controls the movement of the tilt mechanism unit 56, the control unit 51 outputs a signal for instructing a movement direction and a movement speed necessary in the tilt mechanism unit 56 to the tilt driving unit 58. The tilt driving unit 58 generates a motor driving signal corresponding to the input signal and outputs the motor driving signal to the tilt motor 57. The tilt motor 57 rotates, for example, in a necessary rotation direction and at a necessary rotation speed in response to the motor driving signal. As a consequence, the tilt mechanism unit 56 is also driven to be moved in the movement direction corresponding to the necessary rotation direction and at the movement speed corresponding to the necessary rotation speed.

Here, the pan mechanism unit 53 includes a rotary encoder (rotation detector) 53a. The rotary encoder 53a outputs a detection signal indicating a rotation angular amount to the control unit 51 in response to the rotational movement of the pan mechanism unit 53. Likewise the tilt mechanism unit 56 includes a rotary encoder 56a. The rotary encoder 56a also outputs a signal indicating a rotation angular amount to the control unit 51 in response to the rotational movement of the tilt mechanism unit 56.

Thus, the control unit 51 can acquire (monitor) information regarding the rotational angular amounts of the pan mechanism unit 53 and the tilt mechanism unit 56 being driven in real time.

The communication unit 52 is a unit which communicates with the pan/tilt head correspondence communication unit 34 of the digital still camera 1 mounted on the pan/tilt head 10 according to a predetermined communication scheme.

Like the pan/tilt head correspondence communication unit 34, the communication unit 52 has a physical layer configuration in which wired or wireless communication signals can be transmitted to and received from the other-side communication unit of the pan/tilt head 10 and a configuration in which a communication process corresponding to a predetermined upper layer of the physical layer is implemented. In the physical layer configuration, the connector 14 of the camera pedestal unit 12 is included in correspondence to the configuration of FIG. 2.

Specifically, the operation unit 60 collectively refers to an operator as the menu button 60a shown in FIG. 4 or 6 and an operation information signal output unit which generates operation information signals in response to the operation executed in the operator and outputs the operation information signals to the control unit 51. The control unit 51 performs a predetermined process in response to the operation information signal input from the operation unit 60.

When a remote controller is prepared for the pan/tilt head 10, a reception unit receiving command signals from the remote controller is also an example of the operation unit 60.

A touch sensor may be installed in the pan/tilt head 10. For example, the surface of the main body 11 in FIG. 2 serves as a touch sensor. In this case, the touch sensor is also an example of the operation unit 60. A detection signal of the touch operation generated by the touch sensor is supplied to the control unit 51.

In some cases, a voice input unit 62 is installed in the pan/tilt head 10. The voice input unit 62 is installed to detect the input of a specific language voice, a specific sound (for example, clapping sound), or the like, for example, as a trigger input at the start of an automatic imaging process or as a trigger input at the start of automatic panorama image capturing.

The voice input unit 62 includes a voice signal processing circuit including a microphone and a microphone amplifier and a voice analysis unit determining a specific sound. The voice analysis may be executed by the control unit 51.

In some cases, the voice input unit 62 is installed in the pan/tilt head 10 for a corresponding case where the input of a specific language voice or a specific sound is determined as the decision of release timing in the digital still camera 1.

In some cases, an imaging unit 63 is installed in the pan/tilt head 10. The imaging unit 63 is installed to detect a specific subject state such as a specific pose or gaze of a user on the side of a subject as a trigger input at the start of an automatic imaging process or as a trigger input at the start of automatic panorama image capturing. In addition, the imaging unit 63 of the pan/tilt head 10 may be used to determine a surrounding situation for image analysis and perform panorama image capturing automatically.

Moreover, when a specific subject situation is determined as the decision of release timing in the digital still camera 1, the imaging unit 63 may be installed in the pan/tilt head 10.

The imaging unit 63 includes an optical system unit, an image sensor, an A/D converter, a signal processing unit, and an image analysis unit. Image analysis may be performed by the control unit 51.

2. Exemplary Function Configuration

Figure 9:
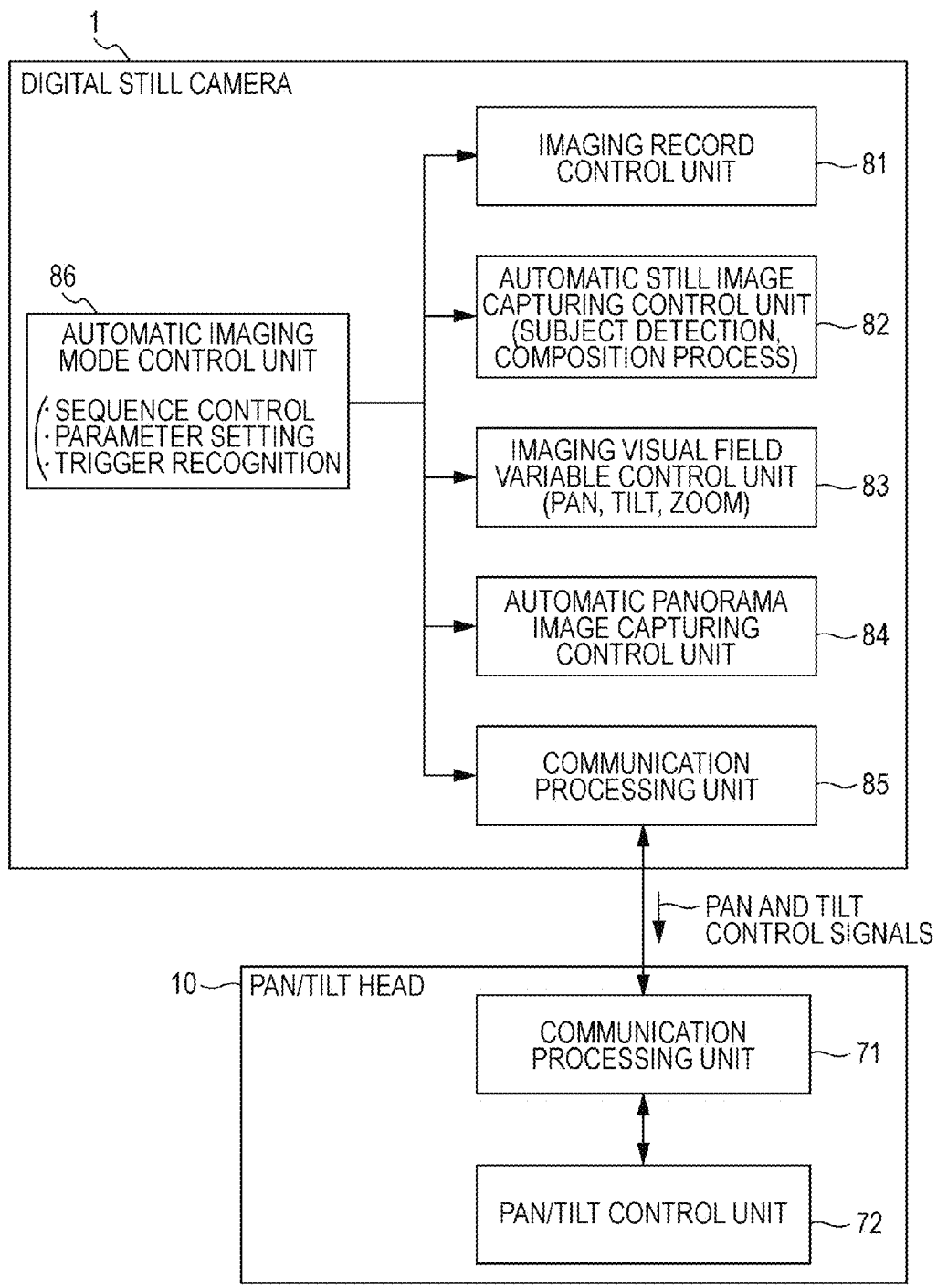
FIG. 9 is a diagram illustrating an exemplary control function configuration according to the embodiment.

FIG. 9 is a block diagram illustrating an exemplary function configuration implemented by hardware and software (program) for the digital still camera 1 and the pan/tilt head 10 according to this embodiment.

This exemplary function configuration is a configuration embodying the imaging control apparatus controlling of the imaging process of this exemplary imaging system. The function configuration mainly describes the hardware structure of the control unit 27 of the digital still camera 1, the control unit 51 of the pan/tilt head 10, and the like and control processing functions implemented in association with software modules activated by the units.

In FIG. 9, the blocks of control functions necessary for the automatic panorama image capturing and the automatic still image capturing, which will particularly be described below, are each shown.

As shown in FIG. 9, the digital still camera 1 (the control unit 27) includes an imaging record control unit 81, an automatic still image capturing control unit 82, an imaging visual field variable control unit 83, an automatic panorama image capturing control unit 84, a communication processing unit 85, and an automatic imaging mode control unit 86.

For example, the pan/tilt head 10 (the control unit 51) includes a communication processing unit 71 and a pan/tilt control unit 72.

First, the imaging record control unit 81 of the digital still camera 1 is a unit which acquires an image obtained by imaging as data (captured-image data) of an image signal and controls storage of the captured-image data in a recording medium. The imaging record control unit 81 also controls reproduction and display processes of the recorded still image data or a display process or the like of the through image at the imaging time.

That is, the imaging record control unit 81 controls the optical system unit 21, the image sensor 22, the A/D converter 23, the signal processing unit 24, the encoding/decoding unit 25, the media controller 26, the display driver 32, and the like in FIG. 7. That is, the imaging record control unit 81 is a function unit which controls the basic processes of the digital still camera 1, for example, gives an instruction of the lens driving control of the optical system unit 21 and the imaging process, the imaging signal process, a record reproduction process, and the like of the image sensor 22 and performs the still image capturing.

The automatic still image capturing control unit 82 is a function unit which performs various processes necessary for performing the automatic still image capturing without the release operation of the user.

One example of the processes is a subject detection process. The subject detection process is a process of confirming each frame image obtained by the signal processing unit 24 while performing the pan/tilt process of the pan/tilt head 10 and entering a subject (for example, the face of a person) within the imaging visual field. Therefore, the automatic still image capturing control unit 82 performs, for example, a process of determining the necessary pan/tilt process of the pan/tilt head 10 or a process of detecting a person, a face, or the like by the image analysis of the frame image data.

Another example of the processes is a composition process. The composition process is a process of determining whether the disposition of a subject image within the imaging visual field is optimum (composition determination) and adjusting the composition (composition adjustment). To adjust the composition, the automatic still image capturing control unit 82 performs, for example, a process of determining the necessary pan/tilt process of the pan/tilt head 10 or a process of determining driving of zoom lens in the optical system unit 21.

The processing function of performing the image analysis for the subject detection process or the composition process may be performed not by the control unit 27 but the DSP (Digital Signal Processor) serving as the signal processing unit 24. Therefore, a function unit serving as the automatic still image capturing control unit 82 may be implemented by a program or an instruction assigned to one or both of the control unit 27 and the DSP serving as the signal processing unit 24.

The imaging visual field variable control unit 83 is a function unit which controls a process of actually varying the imaging visual field. The imaging visual field is varied by the pan/tilt of the pan/tilt head 10 or the zoom process of the optical system unit 21. Therefore, the imaging visual field variable control unit 83 is a function unit which performs the pan/tilt control and the zoom control.

When a cameraman manually takes a photograph of an image with the digital still camera 1, the imaging visual field variable control unit 83 controls the driving of the zoom lens, for example, in response to the zoom operation of the cameraman.

When the automatic still image capturing or the panorama image capturing is performed in the mounted state on the pan/tilt head 10, the imaging visual field variable control unit 83 performs zoom driving control, pan driving control, and tilt driving control in response to the determination or instruction of the automatic still image capturing control unit 82 or the instruction from the automatic panorama image capturing control unit 84.

In the pan driving control and the tilt driving control, pan/tilt control signals are transmitted to the pan/tilt head 10 via the communication processing unit 85.

For example, the imaging visual field variable control unit 83 outputs the pan/tilt control signals to give an instruction of pan/tilt movement amounts determined by the automatic still image capturing control unit 82 to the pan/tilt head 10 in response to the pan/tilt movement amounts, when the composition adjustment or the like is performed.

The imaging visual field variable control unit 83 also drives and controls the zoom process of the optical system unit 21 in response to a zoom magnification determined by the automatic still image capturing control unit 82.

When the panorama image capturing is performed on the mounted state on the pan/tilt head 10, the rotational movement in the substantially horizontal direction in panorama image capturing is achieved. Therefore, the imaging visual field variable control unit 83 also transmits the pan/tilt control signal to mainly give an instruction of the pan process to the pan/tilt head 10 via the communication processing unit 85.

The communication processing unit 85 is a unit which communicates with the communication processing unit 71 of the pan/tilt head 10 according to a predetermined communication protocol.

The pan/tilt control signals generated by the imaging visual field variable control unit 83 are transmitted to the communication processing unit 71 of the pan/tilt head 10 by the communication of the communication processing unit 64.

When the automatic still image capturing is performed without the release operation of the user in the automatic imaging mode, the automatic imaging mode control unit 86 controls the processing sequence of the automatic still image capturing. Specifically, processes described below with reference to FIGS. 13 and 15 are instructed and performed by each function unit.

Figure 13:
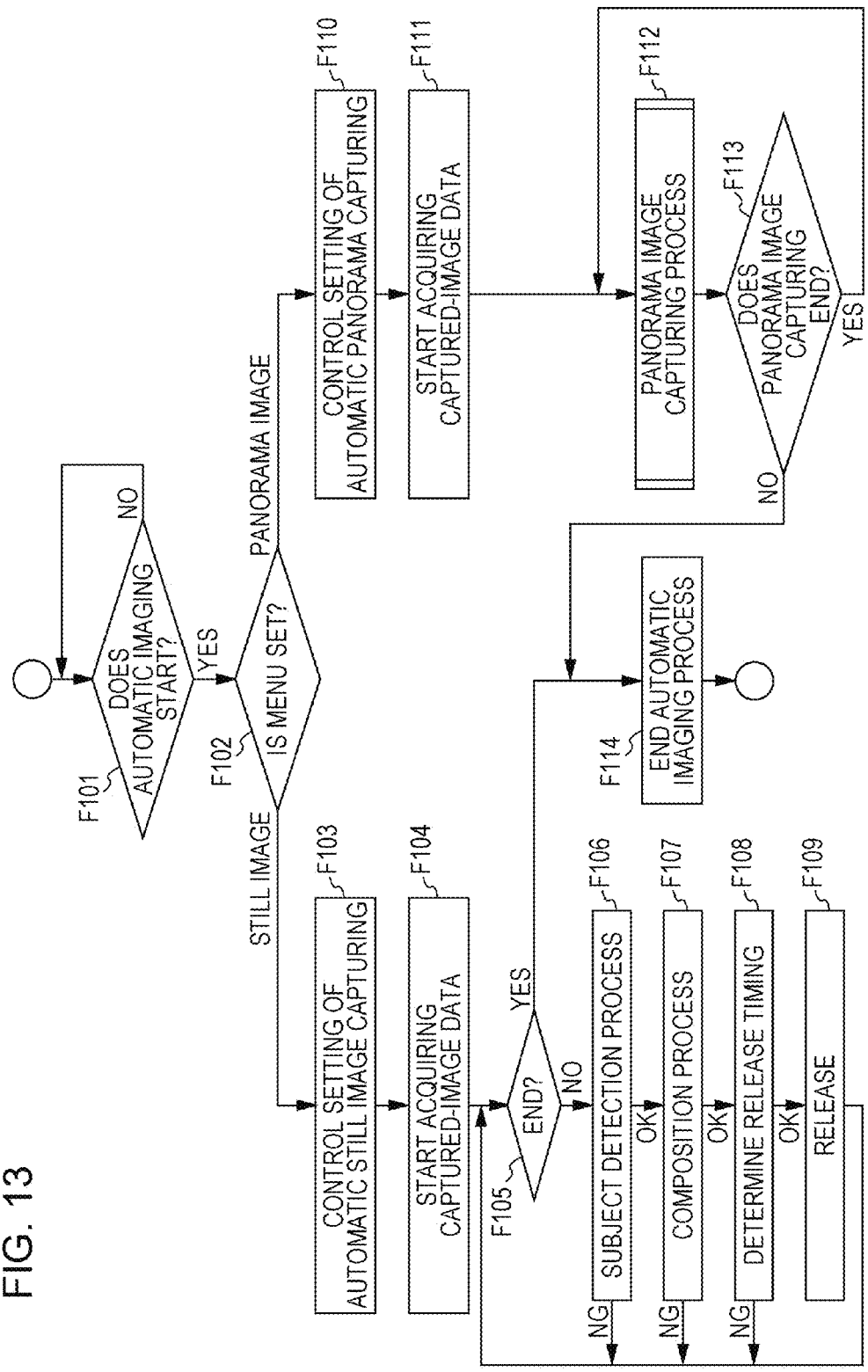
FIG. 13 is a flowchart illustrating an automatic imaging process according to a first embodiment.
Figure 15:
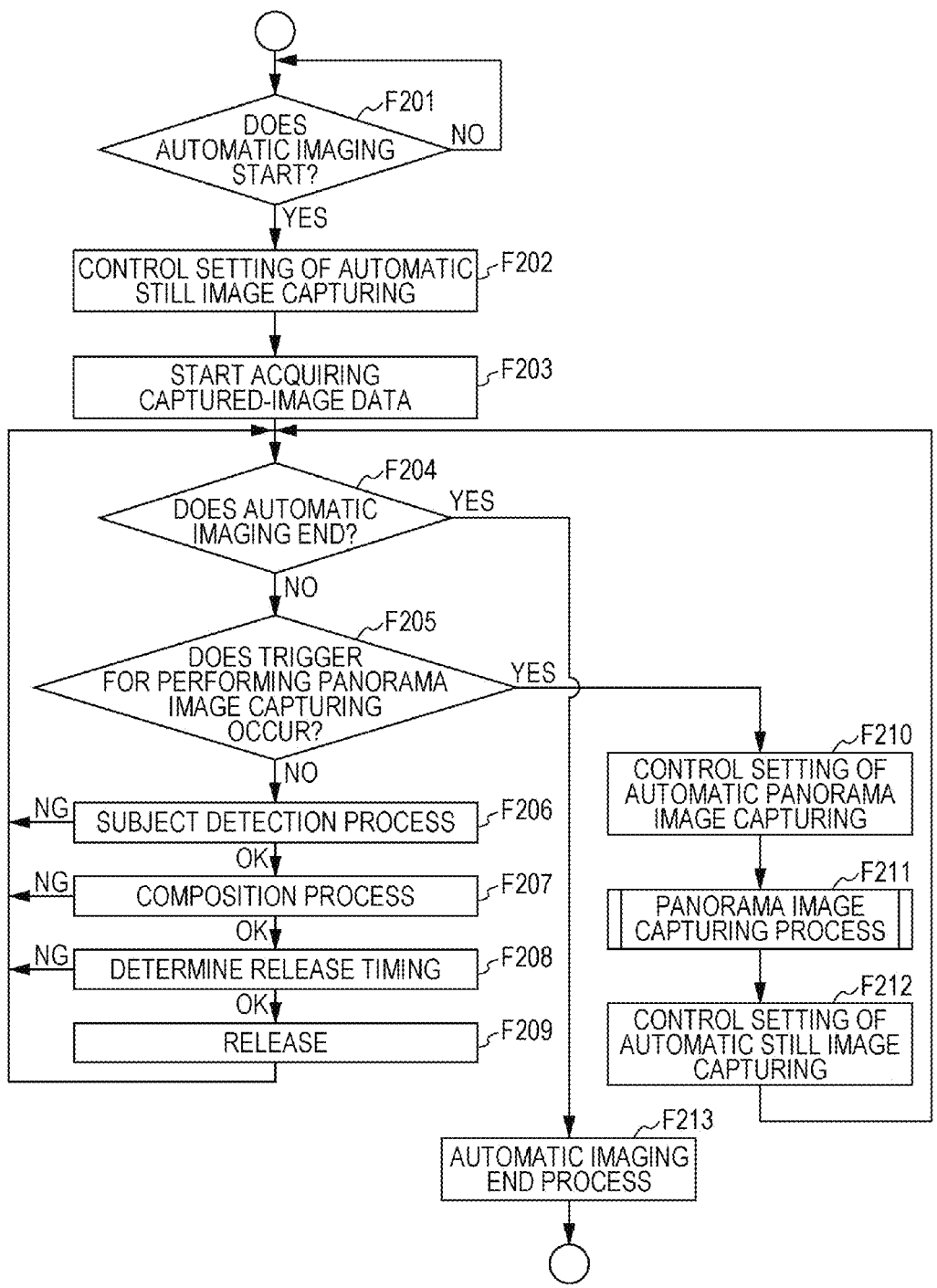
FIG. 15 is a flowchart illustrating an automatic imaging process according to a second embodiment.

The automatic imaging mode control unit 86 also performs a trigger input recognition process as a determination process performed in the sequences of the processes in FIGS. 13 and 15. Examples of the trigger input recognition process include start trigger of the automatic imaging mode, trigger of the release timing, and trigger of the panorama image capturing execution.

The automatic imaging mode control unit 86 also performs a process of changing the control settings (for example, a parameter or a control algorithm) between when the automatic still image capturing is performed and when the automatic panorama image capturing is performed.

Next, the communication processing unit 71 of the pan/tilt head 10 in the function configuration of FIG. 9 is a unit which communicates with the communication processing unit 85 of the digital still camera 1.

When the pan/tilt control signals are received, the pan/tilt control signals are output to the pan/tilt control unit 72.

The pan/tilt control unit 72 executes a function of performing the process associated with the pan/tilt control in the control performed by the control unit 51 of the pan/tilt head 10 shown in FIG. 8, for example.

The pan/tilt control unit 72 controls the pan driving unit 55 and the tilt driving unit 58 shown in FIG. 8 in response to the input pan/tilt control signals. Thus, for example, panning or tilting for the panorama image capturing or a subject detection process or panning or tilting for obtaining an optimum horizontal visual angle and an optimum vertical visual angle for the composition process are used.

In FIG. 9, the blocks of the control function units are shown, but may not be implemented by each independent program module or hardware. In effect, a processing process according to an embodiment described below may be implemented as a comprehensive process of the control function units.

3. Panorama Image Capturing

The digital still camera 1 according to this embodiment can perform the automatic panorama image capturing in the state where the digital still camera 1 is mounted on the pan/tilt head 10. Hereinafter, the overview of the panorama image capturing will be described with reference to FIG. 10.

For example, a 360-degree surrounding scene captured at the position of the digital still camera 1 as the center position is shown in Part (a) of FIG. 10. The panorama image capturing is a process of obtaining the surrounding scene as one image within a wide range.

The processes of the digital still camera 1 are as follows.

For example, when the digital still camera 1 mounted on the pan/tilt head 10 automatically performs the panorama image capturing, the digital still camera 1 is rotated by the pan/tilt head 10. That is, the digital still camera 1 is panned. By the panning, a subject direction (the image visual field) of the digital still camera 1 is horizontally moved.

During the horizontal movement, the digital still camera 1 acquires frame image data captured at each predetermined frame interval, as frames F1, F2, F3, . . . , and Fn shown in Part (b) of FIG. 10.

The synthesis process is performed using necessary areas of the frame image data F1 to Fn. Here, the detailed description of the synthesis process is omitted, but the images captured as the plurality of frame image data are linked to each other consequently. Then, the panorama image data as shown in Part (c) of FIG. 10 is generated and recorded as one piece of panorama image data in the memory card 40.

For example, when the pan/tilt head 10 rotates the digital still camera 1 by 360°, the entire surrounding scene obtained by setting the position of the digital still camera 1 as the center can be acquired as one panorama image.

In particular, by rotating the digital still camera 1 mounted on the pan/tilt head 10, a high-quality panorama image can be acquired compared to a panorama image acquired when the user holds the digital still camera 1 with his hands and moves the digital still camera 1 in the subject direction. This is because the image synthesis can be appropriately performed on the respective frame image data at a constant panning speed without upper and lower blurs in each frame image data.

When the digital still camera 1 is mounted on the pan/tilt head 10, the quality of the panorama image is maintained and more various kinds of panorama image capturing can be implemented due to the fact that the blur is not taken into consideration, as described above. As one example thereof, a method of capturing the multiple-panorama image to obtain a bigger image may be considered.

A multiple-panorama image refers to an image which is wide in both the horizontal and vertical directions and is acquired by performing the imaging, for example, by panning twice with a change in the tilt direction.

Figure 11A:
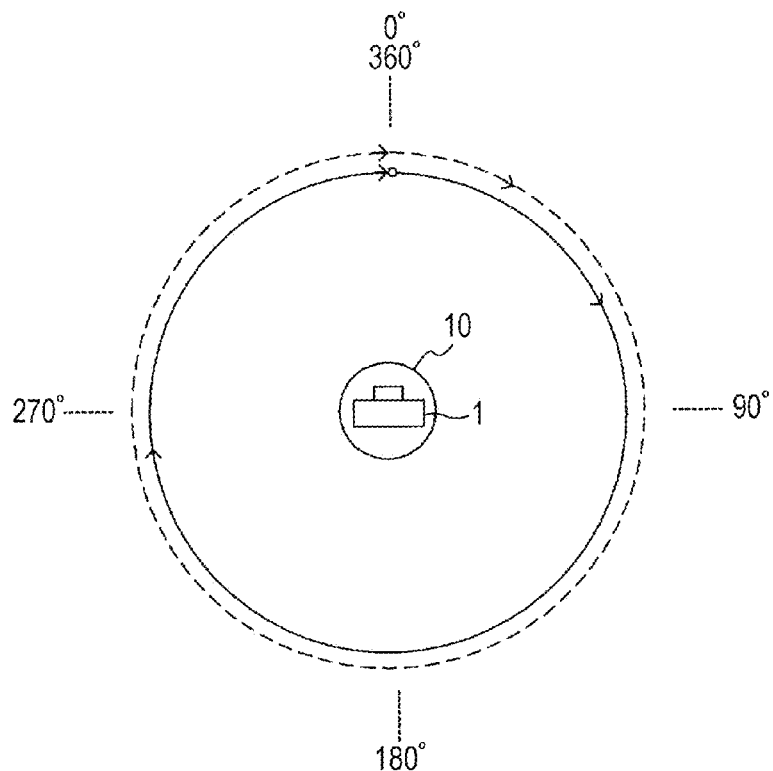
FIGS. 11A to 11C are diagrams illustrating multiple-panorama image capturing according to the embodiment.

The digital still camera 1 mounted on the pan/tilt head 10 is shown in FIG. 11A. First, the digital still camera 1 acquires the captured-image data of many frames, while the pan/tilt head 10 pans the digital still camera 1 during a first panning as indicated by a solid arrow.

Then, the digital still camera 1 acquires the captured-image data of many frames, while the pan/tilt head 10 pans the digital still camera 1 during a second panning as indicated by a dot arrow.

Figure 11B:
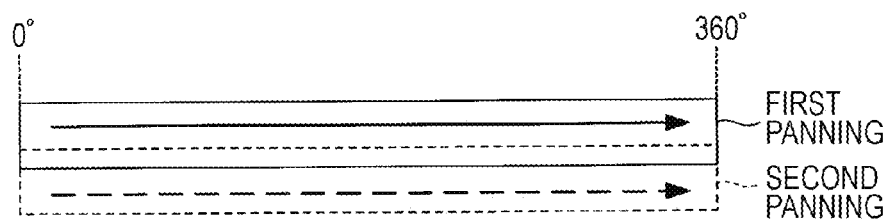

In this case, the tilt position of the imaging visual field is changed during the first panning and the second panning. For example, as shown in FIG. 11B, the tilt direction is shifted to the degree that the tilt direction partially overlaps at the time of the first panning and the time of the second panning.

The digital still camera 1 synthesizes the captured images during the first panning and the second panning to generate the panorama image data.

Figure 12A:
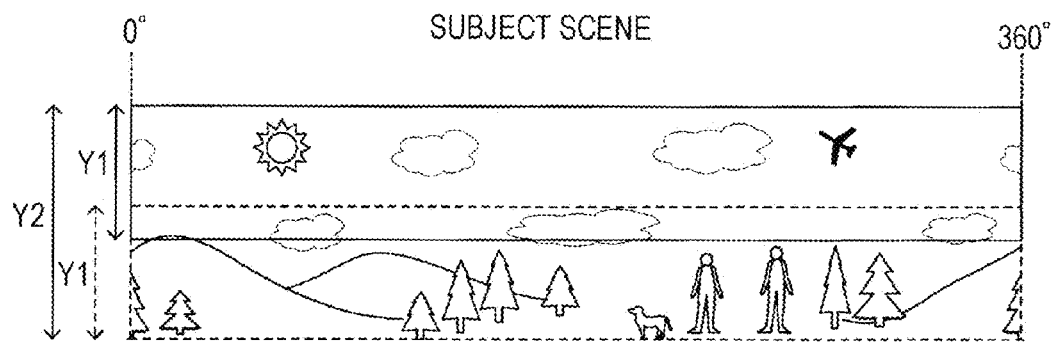
FIGS. 12A and 12B are diagrams illustrating an example of a captured multiple-panorama image according to the embodiment.
Figure 12B:
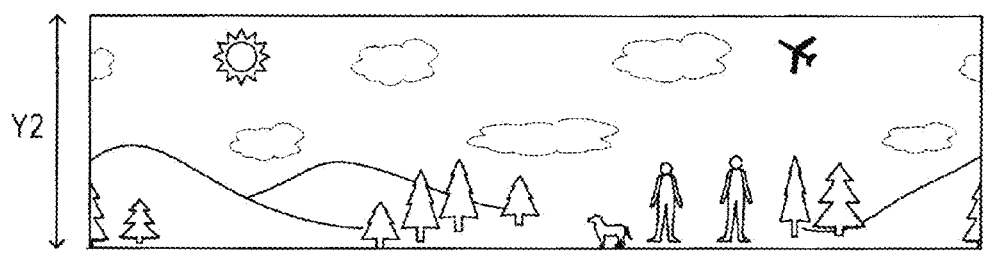

By performing the multiple-panorama image capturing, for example, a panorama image shown in FIGS. 12A and 12B can be obtained.

For example, a range falling in a size in the vertical direction of the imaging visual field is assumed to be Y1 at the zoom magnification of the digital still camera 1 in the 360-degree surrounding subject scene as shown in FIG. 12A.

In this case, by capturing the scene falling within the range indicated by the solid-line range in the first panning and the scene falling within the range indicated by a dashed-line range in the second panning and performing the synthesis process, the panorama image data including a scene within a range Y2 in the vertical direction as shown in FIG. 12B can be generated.

Here, the panorama image is captured by performing the panning twice, but may be captured by performing the panning three or more times, of course. Thus, panorama image data including a subject scene wider in the extended vertical direction can be obtained.

As well as the horizontal panning at each panning time, spiral rotation may be performed using the tilt process.

Figure 11C:
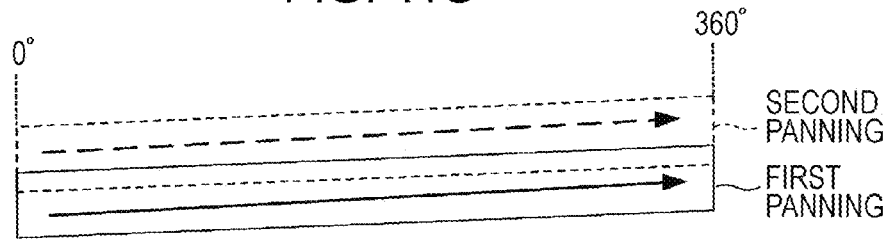

For example, the panning may be performed, for example, twice while continuously performing upward tilting by a predetermined amount. As shown in FIG. 11C, a spiral surrounding scene can be captured so that a wider scene is included in the vertical direction. Of course, the panning may be performed three or more times.

As for the multiple-panorama image capturing described above, the high-quality panorama image data may not be generated unless completely stable panning and tilting are performed. In effect, when the user holds the digital still camera to perform the panorama image capturing by panning at plurality of times, a gap may occur in the scene or the sizes in the vertical direction at the respective angle positions may not match with each other. Therefore, it is difficult to obtain a satisfactory synthesized image. In other words, when the automatic panorama image capturing is performed in the mounted state on the pan/tilt head 10, the wider scene image can be obtained as the multiple-panorama image.

4. First Exemplary Automatic Imaging Process

A first exemplary automatic imaging process of this exemplary imaging system will be described.

In the automatic imaging mode, two kinds of processes of automatic still image capturing and automatic panorama image capturing can be performed.

In the first exemplary automatic imaging process, a user selects and sets either the still image capturing or the panorama image capturing as the automatic imaging by operating a menu in advance, and then instructs starting of the automatic imaging.

FIG. 13 is a diagram illustrating the process of the control unit 27 of the digital still camera 1, which is performed by the mechanism configuration shown in FIG. 9.

When the user gives an instruction for the automatic imaging by a predetermined operation, the process proceeds from step F101 to step F102 and the control unit 27 (the automatic imaging mode control unit 86) confirms the selection setting of the user.

When the user selects the automatic imaging of a normal still image by setting of the menu operation, the process proceeds to step F103. On the other hand, when the user selects the automatic imaging of a panorama image, the process proceeds to step F110.

First, a case where the automatic still image capturing is selected will be described.

In step F103, the control unit 27 (the automatic imaging mode control unit 86) sets a parameter, an algorithm, or the like for the automatic still image capturing. For example, the control unit 27 sets the maximum tilt angle, a panning speed, an algorithm for the subject detection process and the composition process (condition setting), the condition of the release timing, and the like. The description of the setting thereof will be made below.

After the control unit 27 performs the various kinds of control settings for the automatic still image capturing, the control unit 27 controls the actual automatic still image capturing.

In the automatic still image capturing, the imaging system of this example performs, as imaging preparation, automatic composition adjustment by setting the composition, which is considered to be optimum for the form of a subject detected by the subject detection process, as a target composition by each process of the subject detection (search), the optimum composition determination, and the composition adjustment. In addition, the release process is automatically performed under a predetermined condition. Thus, the appropriate still image capturing is performed without the operation of a cameraman.

When the imaging process starts in the automatic still image capturing mode, acquiring the captured-image data starts in step F104.

That is, the control unit 27 (the imaging record control unit 81) starts acquiring each frame of the captured-image data captured and processed by the image sensor 22 and the signal processing unit 24.

Thereafter, the processes from step F106 to F109 are performed until it is determined that the automatic still image capturing has ended in step F105.

In step F106, the subject detection process is performed. In step F107, the composition process is performed.

The subject detection process and the composition process (the optimum composition determination and the composition adjustment) are executed by the function of the automatic still image capturing control unit 82 (specifically, the process of the control unit 27 and/or the signal processing unit 24).

After the acquiring of the captured-image data starts in step F104, the signal processing unit 24 sequentially obtains the frame image data corresponding to one still image as the captured-image data captured by the image sensor 22.

As the subject detection process, the automatic still image capturing control unit 82 detects an image part corresponding to the face of a person from each frame image data.

The subject detection process may be performed on each of all of the frames or may be performed at the interval of the predetermined number of frames.

In the subject detection process of this example, a face frame corresponding to the area of the face part of the image is set in each subject detected from the image using, for example, a so-called face detection technique. Moreover, information regarding the number of subjects within the image frame, the size of each subject, or the position of the subject within each image frame is obtained from the information regarding the number, size, or position of the face frames.

Many face detection techniques have been suggested. In this embodiment, the face detection technique is not particularly limited. An appropriate face detection technique may be used in consideration of detection precision, the degree of design difficulty, or the like.

In the subject detection process of step F106, subjects existing near the digital still camera 1 are searched for first.

Specifically, in the search for the subject, the subject detection process is performed by the image analysis of, for example, the signal processing unit 24 (or the control unit 27), while the control unit 27 (the automatic still image capturing control unit 82 and the imaging visual field variable control unit 83) of the digital still camera 1 performs the pan/tilt control for the pan/tilt head 10 or the zoom control for the optical system unit 21 in order to vary the imaging visual field.

The search for the subject is performed until the subject is detected in the frame image as the captured-image data. Then, the search for the subject ends when the subject (the face of a person) existing in the frame image, that is, the imaging visual field at that time is detected.

After the subject detection process ends, the control unit 27 (the automatic still image capturing control unit 82) performs the composition process in step F107.

In the composition process, it is first determined whether the composition at that time is optimum. In this case, an image structure is determined based on the subject detection result (in this case, the number of subjects, the size of the subject, the position of the subject, and the like in the image frame are determined), and then the composition considered to be optimum is determined according to a predetermined algorithm based on the information regarding the image structure determined in the image structure determination.

In this case, the composition can be determined depending on each imaging visual field of the pan, the tilt, and the zoom. Accordingly, in the process of determining whether the composition is optimum, information regarding the controlled variables of pan, tilt, and zoom for obtaining the optimum imaging visual field in response to the subject detection result (the form of the subject within the image frame) is obtained as the determination result.

When the composition is not optimum, the pan/tilt control and the zoom control are performed as the composition adjustment to achieve the optimum composition state.

Specifically, the control unit 27 (the automatic still image capturing control unit 82 and the imaging visual field variable control unit 83) instructs the control unit 51 of the pan/tilt head 10 to obtain modification information regarding each controlled variable of the pan/tilt obtained by the optimum composition determination for the control of the composition adjustment.

Then, the control unit 51 of the pan/tilt head 10 obtains the movement amounts of the pan mechanism unit 53 and the tilt mechanism unit 56 in response to the instruction for the controlled variables and supplies the control signals to the pan driving unit 55 and the tilt driving unit 58 to implement the pan driving and the tilt driving of the obtained movement amounts.

In addition, the control unit 27 (the automatic still image capturing control unit 82 and the imaging visual field variable control unit 83) instructs the optical system unit 21 to obtain information regarding the image angle for the zoom obtained by the optimum composition determination and allows the optical system unit 21 to perform the zoom process so as to obtain the instructed image angle.

When it is determined that the composition is not optimum by the composition process and the pan/tilt control and the zoom control are performed as the composition adjustment, the process resumes from the subject detection process of step F106. This is because the subject may deviate from the imaging visual field due to the pan, tilt, zoom processes or the movement of the person.

When obtaining the optimum composition, the control unit 27 (the automatic imaging mode control unit 86) determines the release timing in step F108.

The release timing may not be OK in the release timing determination process of step F108 in some cases. In this case, however, the process resumes from the subject detection process of step F106. This is because the subject may deviate from the imaging visual field due to the movement of the person or the like or the composition may be collapsed.

When it is considered that the release condition is satisfied in the release timing determination process, the captured-image data is automatically recorded as the release process of step F109. Specifically, the control unit 27 (the imaging record control unit 81) controls the encoding/decoding unit 25 and the media controller 26 in order to record the captured-image data (frame image) obtained at that time in the memory card 40.

Here, the release timing determination process of step F108 is a process of determining whether the conditions for predetermined still image capturing are satisfied in order to obtain an appropriate still image. Various examples thereof may be considered.

For example, the release timing determination for time is considered. For example, a predetermined time (for example, 2 or 3 seconds) which has elapsed from the time at which the composition process is OK may be set as the condition for the still image capturing. In this case, the control unit 27 (the automatic imaging mode control unit 86) measures a predetermined time in step F108. After the predetermined time, the control unit 27 (the imaging record control unit 81) performs the release process in step F109.

When a specific subject state is determined from the captured image, it may be determined that the condition of the still image capturing is satisfied.

The control unit 27 (the automatic imaging mode control unit 86) monitors existence or non-existence of the specific subject state detected by the analysis of the captured image in step F108.

As the specific subject state, a specific expression such as a smiling face of the subject determined in the composition process or a specific gesture of a behavior such as waving a hand toward the imaging system, raising a hand, clapping hands, making a peace sign, or winking toward the imaging system may be considered. Alternatively, a behavior or the like of the user as a subject gazing at the imaging system may be considered.

In step F108, the control unit 27 performs the image analysis process on the captured-image to determine the specific state of the user. When the specific subject state is detected, it is assumed that the release timing has been reached and thus the release process is performed in step F109.

In a case where the digital still camera 1 includes the voice input unit 35, it may be determined that the condition of the still image capturing is satisfied when a specific sound is input.

For example, a specific word uttered by the user, a clapping sound, or a whistling sound may be regarded as the specific sound which is the condition of the still image capturing. In step F108, the control unit 27 (the automatic imaging mode control unit 86) detects the input of the specific sound.

When the specific sound is confirmed from the result of the input voice signal analysis of the voice input unit 35, the release timing has reached and the control unit 27 performs the release process in step F109.

By repeating the processes from steps F106 to F109, the still image capturing is automatically performed many times.

When it is determined that the automatic still image capturing has ended by means of a predetermined end trigger such as the operation of the user in step F105, the process proceeds to step F114 and the control unit 27 ends the series of automatic imaging mode processes by terminating the automatic imaging process.

When the automatic panorama image capturing is selected and set, the process of the control unit 27 proceeds from step F102 to step F110.

In step F110, the control unit 27 (the automatic imaging mode control unit 86) sets a parameter, an algorithm, or the like for the automatic panorama image capturing. For example, the control unit 27 sets the maximum tilt angle, a panning speed, an algorithm for the subject detection process and the composition process (condition setting), the condition of the release timing, and the like. The description of the setting thereof will be made below.

After the control unit 27 performs the various kinds of control settings for the automatic panorama image capturing, the control unit 27 controls the actual automatic panorama image capturing.

In the automatic panorama image capturing, the imaging system of this example acquires many frame image data, while automatically performing panning at a predetermined angle, and synthesizes the frame image data in order to generate the panorama image data.

When the imaging process starts in the automatic panorama image capturing mode, acquiring the captured-image data first starts in step F111.

That is, the control unit 27 (the imaging record control unit 81) starts acquiring each frame of the captured-image data captured and processed by the image sensor 22 and the signal processing unit 24.

Thereafter, the panorama image capturing of step F112 is performed until it is determined that the automatic panorama image capturing has ended in step F113.

Figure 14:
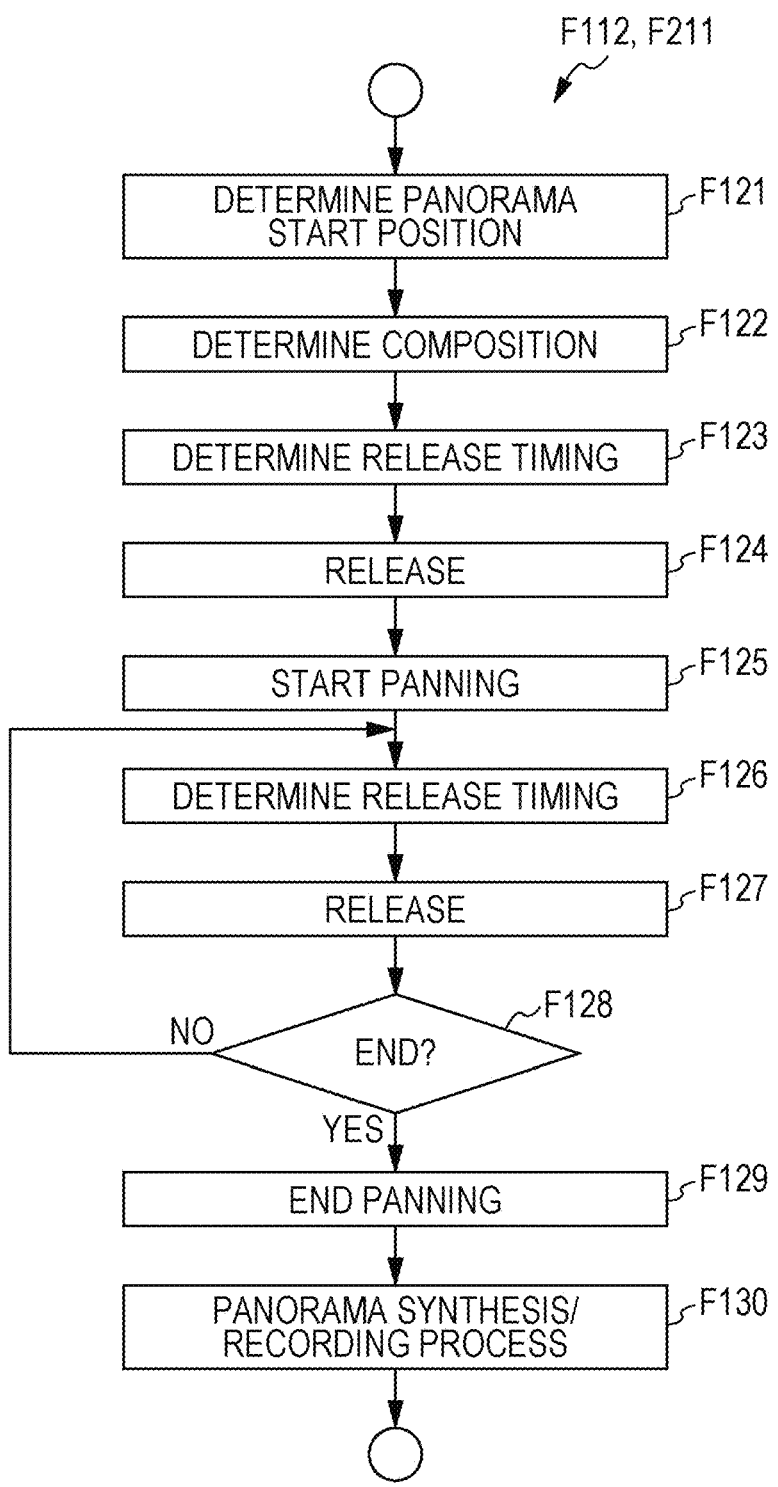
FIG. 14 is a flowchart illustrating a panorama image capturing process according to the embodiment.

The details of the panorama image capturing in step F112 is shown in FIG. 14.

In step F121 of FIG. 14, the control unit 27 (the automatic panorama image capturing control unit 84) first determines a panorama start position.

Various examples of algorithms for determining the panorama start position may be considered. For example, the panning position at the panning start time may be set as the panorama start position.

Alternatively, the panorama start position may be set by performing subject detection (face detection), for example, while preliminarily performing 360-degree panning, and locating an area where most people as subjects are gathered together at the center of the panorama image. Alternatively, a panorama start position at which many subjects are disposed in good balance may be set.

When the panning angle is less than 360° at the panorama image capturing time, for example, when the panning angle is set to be 270°, the panorama start position, at which a panorama image in which the subjects are disposed in good balance is likely to be obtained, may be set within the range of 270°.

When the panorama start position is determined, for example, by the predetermined algorithm, the control unit 27 (the automatic panorama image capturing control unit 84 and the imaging visual field variable control unit 83)

instructs the pan/tilt head 10 to drive and control the panning position and the tilt position to the determined panorama start position.

Next, the control unit 27 (the automatic panorama image capturing control unit 84 and the imaging visual field variable control unit 83) determines the composition in step F122. Here, mainly the zoom magnification is set. In some case, the tilt angle is adjusted.

When the composition is determined, the actual panorama image capturing starts. First, the control unit 27 (the automatic imaging mode control unit 86 and the imaging record control unit 81) determines the release timing in step F123, and then performs and controls the release in step F124 under a predetermined condition.

That is, in the composition determined at the panorama start position, initial one piece of frame image data is acquired.

In this case, the release timing determination may be performed using a smiling face or a specific behavior of a subject, a specific sound, or the like as in step F108 of FIG. 13. However, since there is no person or the like as the subject, the release timing may be determined without condition after the composition determination. The release in the case of the panorama image capturing of FIG. 14 does not mean the recording of the still image data, of course, but means the acquisition as the image data to be synthesized.

Then, the control unit 27 (the automatic panorama image capturing control unit 84 and the imaging visual field variable control unit 83) instructs the pan/tilt head 10 to start the panning in step F125.

After the panning starts, the control unit 84 performs the release timing determination in step F126 and controls the release in step F127. The processes are repeated until the panorama image capturing ends in step F128.

That is, while performing the panning, the release timing determination is performed and the frame image data are sequentially acquired.

The release timing determination of step F126 is considered to be controlled, for example, at every fixed time interval or every fixed panning angle. That is, the condition of the release timing determination is different from that of step F108 of FIG. 13.

For example, when the condition is set so that the panorama image is captured by 360-degree panning, the control unit 27 (the automatic imaging mode control unit 86) determines that the panorama image capturing has ended in step F128 when the 360-degree panning is completed. At this time, the control unit 86 (the imaging visual field variable control unit 83) instructs the pan/tilt head 10 to end the panning in step F129. In step F130, the control unit 86 (the imaging record control unit 81) controls the synthesis process of synthesizing the many frame image data acquired at that time and the recording of the synthesized panorama image data in the memory card 40.

Thus, the panorama image capturing in step F112 of FIG. 13 is completed.

When the multiple-panorama image capturing described with reference to FIGS. 11A to 11C and FIGS. 12A and 12B is performed, although not described with reference to FIG. 14, the tilt angle is modified at every rotation or the tilt angle is continuously modified while the panning is performed, after step F125.

When the panorama image capturing is performed once in the automatic imaging mode and ends, it is determined that the automatic panorama image capturing has ended in step F113. Thus, the control unit 27 ends the automatic imaging mode process in step F114.

When the panorama image capturing is repeated in the automatic imaging mode, the process returns from step F113 to step F112 to repeat the panorama image capturing. When a termination process of the user or the imaging is performed completely by the set number of times of the panorama image capturing, the automatic panorama image capturing ends in step F113. Thus, in step F114, the control unit 27 ends the automatic imaging mode process.

The automatic still image capturing or the automatic panorama image capturing is performed in the automatic imaging mode, for example, in the above-described manner. However, the control unit 27 changes the control setting between when the automatic still image capturing is performed and when the automatic panorama image capturing is performed. That is, the parameters or the like are changed in each of the processes of steps F103 and F110.

Specifically, the following setting example is considered.

First, there is no particular limitation on the setting of the panning speed when the automatic still image capturing is performed. This is because the panning stops in the still image capturing. By contrast, in the automatic panorama image capturing, a panorama image is captured while the panning is performed. Therefore, the panning may be performed rapidly during the panorama image capturing when the surroundings are sufficiently light. However, it is desirable that the panning is performed slowly, when the surroundings are dark. In addition, there is an appropriate speed range.

Accordingly, as the setting of the panning speed, non-limitation on the panning speed is set in the automatic still image capturing and the limitation of the panning speed within a predetermined speed range is set in the automatic panorama image capturing. Alternatively, a predetermined speed is set in response to the surrounding amount of light. That is, the panning speed is set to be variable.

The control unit 27 (the automatic imaging mode control unit 86) performs the settings in steps F103 and F110 of FIG. 13. In this case, the panning in the subject detection process and the composition process in steps F105 and F107 and the panning speed in step F112 (after step F125 of FIG. 14) are in response to the corresponding settings.

In the automatic panorama image capturing, the panning is performed slowly when the surroundings are dark, and the panning is performed rapidly to some extent when the surroundings are light. In this case, the control unit 27 may detect the amount of surrounding light from an average luminance level or the like of the image data being captured and controls the panning speed in response to the amount of surrounding light.

The control of the panning speed in the pan/tilt head 10 may be performed depending on both the surrounding amount of light and the zoom magnification or the resolution at that time. For example, when the zoom magnification is high or the set resolution is high, the panning speed is controlled so as to appear visually slow.

As for the tilting, when the tilt angle is too large in the panorama image capturing, distortion may easily occur in the synthesis process and the quality of the panorama image deteriorates. When the panorama image capturing is performed, the tilt angle is preferably close to 0°. This is because the subject in a sphere direction centered on the digital still camera 1 is cut off and synthesized.

In the automatic panorama image capturing, the setting of the maximum tilt angle, that is, setting of the upper limit of the tilt angle may be taken into consideration. In the automatic still image capturing, the tilt angle is not limited within the tilt movable range of the pan/tilt head 10.

The control unit 27 (the automatic imaging mode control unit 86) performs the settings in steps F103 and F110 of FIG. 13. In this case, the tilting range of the subject detection process and the composition process in steps F105 and F107 and the tilting range in step F112 (steps F121 and F122 of FIG. 14) are in response to the corresponding settings.

The subject detection process and the composition process are as follows.

In the automatic still image capturing, as described above, the subject detection process is performed on a target subject such as a person and the composition process is performed to obtain the optimum composition of the subject. In the automatic panorama image capturing, minute adjustment in the panning direction in the composition process is not necessary since the image is captured in a wide range in the pan direction. In particular, in the case of the 360-degree panorama image capturing, the adjustment in the pan direction is not necessary in the composition process. Rather, the setting of the panning start position is important. This is because how each subject is disposed in the panorama image is determined.

The zoom may become wide in the panorama image capturing. In addition, since photographing forward movement is preferred to bust-up in the panorama image capturing, the zoom magnification or the central position of a face may be set to be higher than that in the normal still image capturing.

Accordingly, the parameter or the algorithm in the subject search or the composition process is changed. For example, in the automatic still image capturing, the determination condition of the optimum composition is obtained in each state of the pan, tilt, and zoom in steps F206 and F207, and the composition process of step F122 in the automatic panorama image capturing is assumed to be the determination condition of only the tilt and zoom.

As for the release timing, in the automatic still image capturing, determining the release timing by the trigger of smiling face detection or from the voice, sound, behavior, or the like of a user, for example, is appropriate to obtain a good image. On the other hand, in the automatic panorama image capturing, waiting for a trigger for each subject person is not appropriate when the frame image data is acquired at the position of each panning angle.

In the automatic panorama image capturing, the release timing determination is performed at a fixed time interval, a fixed panning angle, or the like.

That is, the determination condition is different in the release timing determination of step F108 and in the release timing determination of step F126.

By making the control settings different in the automatic still image capturing and in the automatic panorama image capturing, as described above, the high-quality image data can be obtained in both the normal still image and the panorama image when the imaging is performed in the automatic imaging mode.

5. Second Exemplary Automatic Imaging Process

A second exemplary automatic imaging process will be described with reference to FIG. 15.

In the second exemplary automatic imaging process, the automatic still image capturing is basically performed, when the process starts in the automatic imaging mode. In the second exemplary automatic imaging process, the automatic panorama image capturing is performed by a given trigger during the automatic still image capturing.

FIG. 15 is a flowchart illustrating the process of the control unit 27 of the digital still camera 1, which is performed by the mechanism configuration shown in FIG. 9.

When the user gives an instruction for the automatic imaging by a predetermined operation, the process proceeds from F201 to step F202 and the control unit 27 (the automatic imaging mode control unit 86) sets the parameter, the algorithm, and the like for the automatic still image capturing. That is, as in the first exemplary automatic imaging process, the control unit 27 sets the maximum tilt angle, the panning speed, the algorithm for the subject detection process and the composition process (condition setting), the condition of the release timing, and the like.

After the control unit 27 performs the various kinds of control settings for the automatic still image capturing, the control unit 27 controls the actual automatic still image capturing.

First, acquiring the captured-image data starts in step F203,

That is, the control unit 27 (the imaging record control unit 81) starts acquiring each frame of the captured-image data captured and processed by the image sensor 22 and the signal processing unit 24.

Thereafter, the processes from step F205 to F209 are performed until it is determined that the automatic imaging mode has ended in step F204.

In step F205, the control unit 27 (the automatic imaging mode control unit 86) confirms whether a trigger for performing the panorama image capturing occurs.

In steps F206 to F209, the automatic still image capturing is performed like steps F106 to F109 of FIG. 13. To avoid making the repeated description, the details are omitted. However, by repeating the processes of steps F206 to F209, many still images are automatically captured.

When it is determined that the automatic imaging mode process has ended by a predetermined end trigger such as an operation of a user in step F204, the process proceeds to step F213 and the control unit 27 ends the series of automatic imaging mode processes by ending the automatic imaging process.

In step F205, the control unit 27 (the automatic imaging mode control unit 86) recognizes a predetermined event as a trigger of the panorama image capturing during the automatic still image capturing.

The following example can be considered as the trigger of the automatic panorama image capturing.

First, an instruction for the panorama image capturing may be given when the user operates the digital still camera 1 or the pan/tilt head 10.

The instruction for the panorama image capturing may be given by performing the panorama image capturing at every fixed time interval. The control unit 27 performs time measurement and performs the automatic panorama image capturing at every fixed time interval during the automatic still image capturing. In this case, the value of the time measurement serves as a trigger.

In addition, the panorama image capturing may be performed when the given number of still images is captured. The control unit 27 counts the number of capturing/recording instances of the automatic still image capturing and performs the automatic panorama image capturing at each interval of the given number of still images during the automatic still image capturing.

The control unit 27 may automatically generate a trigger for the panorama image capturing depending on the state of image recognition (subject search). For example, the control unit 27 can recognize the existence of a surrounding subject (person) by performing the automatic still image capturing while performing the subject detection process of step F206. For example, when a person is likely to exist in all rotation directions, the control unit 27 may determine that the 360-degree panorama image capturing will be performed.

Alternatively, when is recognized that there is a person within a predetermined angle range, for example, there is a person as a subject in the range from 20° to 170° as the panning position of the pan/tilt head 10, the control unit 27 may determine that panorama image capturing within the range from 20° to 170° will be performed.

For example, when the control unit 27 (the automatic imaging mode control unit 86) determines that the panorama image capturing will be performed during the automatic still image capturing by the input or determination, the process proceeds to step F210. In step F210, the control unit 27 (the automatic imaging mode control unit 86) sets the parameter, the algorithm, or the like for the automatic panorama image capturing. For example, the control unit 27 sets the maximum tilt angle, the panning speed, the algorithm for the subject detection process and the composition process (condition setting), the condition of the release timing, and the like.

After the control unit 27 performs the various kinds of control settings for the automatic panorama image capturing, the control unit 27 controls the actual automatic panorama capturing in step F211.

The panorama image capturing of step F211 is the same as the process described with reference to FIG. 14. When the panorama image capturing ends, the parameters, the algorithms, and the like for the automatic still image capturing are set in step F212 (the same setting in step F202) and the process returns to step F204. Then, the control unit 27 resumes the automatic still image capturing.

As described above, the automatic still image capturing and the automatic panorama image capturing are performed in the automatic imaging mode. However, the control unit 27 changes the control settings between when the automatic still image capturing is performed and when the automatic panorama image capturing is performed. That is, the parameter and the like are changed by each of the processes of steps F202 (F212) and F210.

Thus, as in the first exemplary automatic imaging process, high-quality image data can be obtained in both the normal still image and the panorama image when the imaging is performed in the automatic imaging mode.

In the first and second exemplary automatic imaging processes described above, the processes are performed in the imaging system including the digital still camera 1 and the pan/tilt head 10, as described above. However, a digital still camera integrally mounted with an imaging visual field variable mechanism serving as a pan/tilt mechanism can also perform the processes.

6. Another Exemplary Function Configuration

The exemplary processing of the embodiment has hitherto been described. Basically, the control process has hitherto been described based on the function configuration of FIG. 9.

For example, the imaging system including the digital still camera 1 and the pan/tilt head 10 may have another exemplary function configuration other than the configuration in FIG. 9. The exemplary function configuration is shown in FIG. 16.

Figure 16:
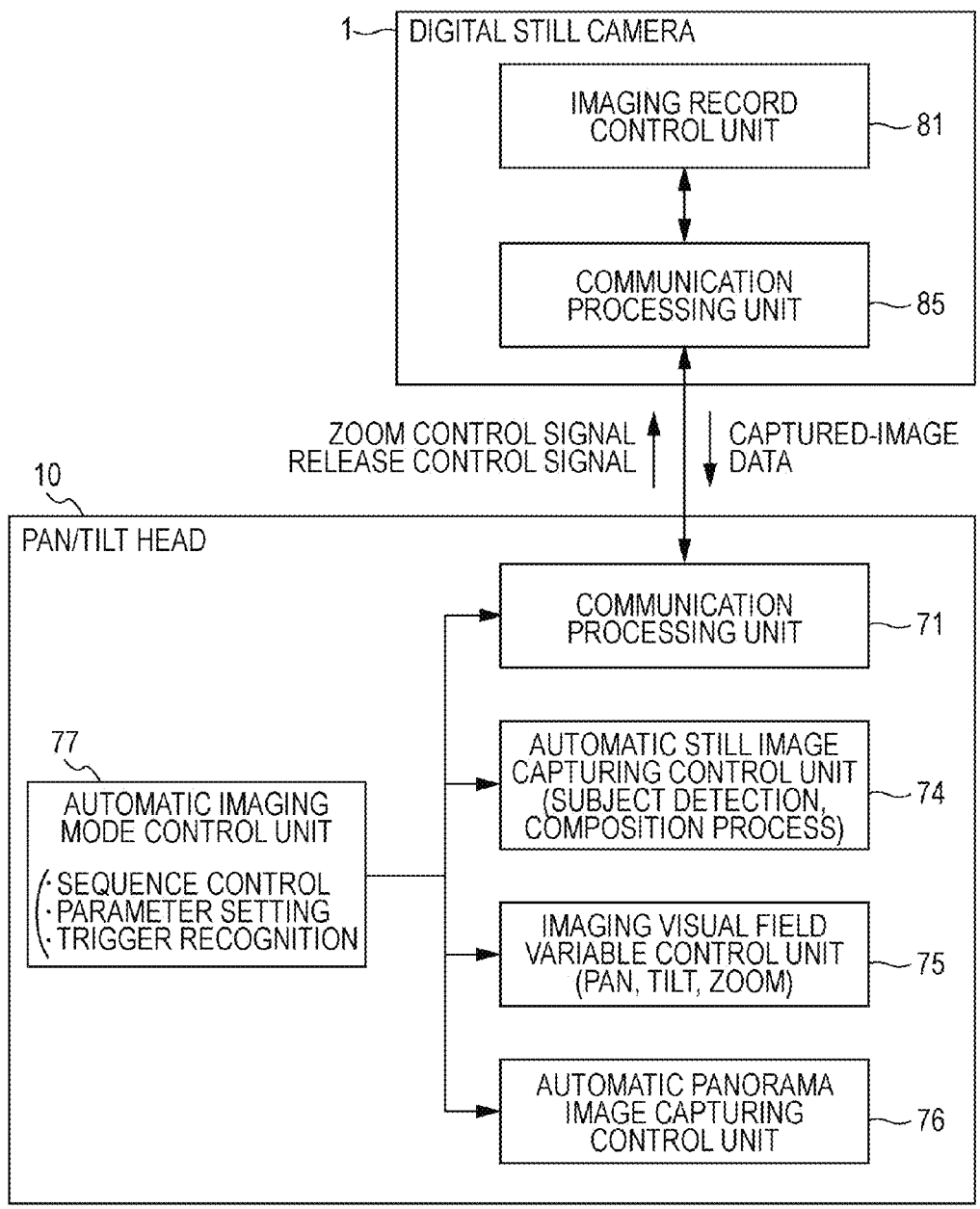
FIG. 16 is a diagram illustrating another exemplary control function configuration according to an embodiment.

FIG. 16 is a diagram illustrating an example of the digital still camera 1 including only the imaging record control unit 81 and the communication processing unit 85. In addition, the pan/tilt head 10 (the control unit 51) includes the communication processing unit 71, an automatic still image capturing control unit 74, an imaging visual field variable control unit 75, an automatic panorama image capturing control unit 76, and an automatic imaging mode control unit 77.

The control process executed by each function unit is basically the same as that described with reference to FIG. 10 except for the following.

The automatic still image capturing control unit 74 receives the captured-image data as each frame image from the signal processing unit 24 of the digital still camera 1 in order to perform the subject detection process or the composition process. The image analysis is performed so that the same subject detection process and the same composition process as those described above are performed. However, when the imaging unit 63 is installed in the pan/tilt head 10, as described with reference to FIG. 8, the subject detection process or the composition process can be performed based on the captured-image data captured by the imaging unit 63.

The imaging visual field variable control unit 75 controls the pan driving unit 55 and the tilt driving unit 58 in response to an instruction from the automatic still image capturing control unit 74 or the automatic panorama image capturing control unit 76 and performs the pan/tilt process of the subject detection or the composition adjustment.

To control the zoom, the imaging visual field variable control unit 75 outputs the zoom control signal to the control unit 27 (the imaging record control unit 81) of the digital still camera 1 via the communication processing unit 71. The imaging record control unit 81 performs and controls the zoom process for the composition adjustment based on the zoom control signal.

The automatic imaging mode control unit 77 gives an instruction to each function unit to implement the same processes as those of FIGS. 13 and 15, for example.

The automatic imaging mode control unit 77 outputs a release control signal to the control unit 27 (the imaging record control unit 81) of the digital still camera 1 via the communication processing unit 71 in order to perform the release process of step F109 or the like of FIG. 13. The imaging record control unit 81 performs and controls the still image record process in response to the release control signal.

The automatic imaging mode control unit 77 also performs user operation detection, outside voice detection, image determination, and the like as trigger recognition.

That is, in FIG. 16, for example, an instruction necessary for the control unit 27 of the digital still camera 1 is given to implement the automatic still image capturing and the automatic panorama image capturing by controlling the automatic capturing mode independently by the pan/tilt head 10.

In this case, the process of FIG. 13 (FIG. 14) or FIG. 15 (FIG. 14) can be considered as the process of the control unit 51 of the pan/tilt head 10.

The exemplary function configurations of FIGS. 9 and 16 have hitherto been described. When the function configuration of FIG. 9 is adopted, the imaging control apparatus according to the embodiments of the invention is mounted on the digital still camera 1. When the function configuration of FIG. 16 is adopted, the imaging control apparatus according to the embodiments of the invention is mounted on the pan/tilt head 10.

The imaging control apparatus according to the embodiments of the invention includes at least the automatic imaging mode control unit 86. Accordingly, even when each function unit is separated and installed in each independent apparatus, an apparatus including at least the automatic imaging mode control unit 86 realizes an example of the invention.

7. Program

A program according to this embodiment is a program causing an arithmetic processing unit (the control unit 27 or the like) such as a CPU to execute the process of FIG. 13 (FIG. 14) or FIG. 15 (FIG. 14) according to the above-described embodiments.

That is, the program causes the digital still camera 1 to execute the imaging process of the automatic still image capturing mode for automatically capturing a still image by performing the subject detection process and the composition process while the pan/tilt variable mechanism varies the imaging visual field.

Moreover, the program causes the digital still camera 1 to execute the imaging process of the automatic panorama image capturing mode for acquiring a plurality of image data by the imaging and performing a process of generating the panorama image data using the plurality of image data while the pan/tilt variable mechanism varies the imaging visual field.

Furthermore, the program executes a process of changing the control setting between when the imaging process of the automatic still image capturing mode is executed and when the imaging process of the automatic panorama image capturing mode is executed.

The program according to this embodiment may be recorded in advance in an HDD as a recording medium built in a person computer or an apparatus such as the digital still camera 1 or the pan/tilt head 10 or in a ROM or the like of a microcomputer including a CPU.

Alternatively, the program may be permanently or temporarily stored (recorded) in a removable recording medium such as a flexible disk, a CD-ROM (Compact Disc Read Only Memory), an MO (Magnet optical) disk, a DVD (Digital Versatile Disc), a Blu-ray disk, a magnetic disk, a semiconductor memory, or a memory card. The removable recording medium can be provided as so-called package software.

The program according to the embodiment of the invention may be installed from the removable recording medium to a personal computer or the like and may also be downloaded from a download site via a network such as a LAN (Local Area Network) or the Internet.

By the program according to the embodiment of the invention, the imaging apparatus or the imaging system realizing the above-described embodiments is embodied and may be widely provided in an appropriate manner.

The present application contains subject matter related to that disclosed in Japanese Priority Patent Application JP 2010-014228 filed in the Japan Patent Office on Jan. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging control apparatus for an imaging apparatus which includes an imaging unit imaging a subject and a variable mechanism included in the imaging control apparatus that varies an imaging visual field among a plurality of imaging visual fields of the imaging unit, the imaging control apparatus comprising:

an automatic imaging mode control unit changing control setting between automatic still image capturing and automatic panorama image capturing;

an imaging visual field variable control unit driving and controlling the variable mechanism of the imaging visual field;

an automatic still image capturing control unit detecting the subject while allowing the imaging visual field variable control unit to vary the imaging visual field to another one of the plurality of imaging visual fields and allowing the imaging apparatus to capture a still image automatically in response to detecting the subject; and an automatic panorama image capturing control unit configured to:

control the imaging apparatus to detect the subject in the imaging visual field while allowing the imaging visual field variable control unit to vary the imaging visual field to another one of the plurality of imaging visual fields, and, upon detection of the subject, to acquire a plurality of image data used to generate panorama image data while allowing the imaging visual field variable control unit to vary the imaging visual field, wherein, in an event the automatic panorama image capturing is performed, the imaging visual field variable control unit is configured to control the variable mechanism such that a portion of one or more image data among the plurality of image data acquired during a first panning of the imaging apparatus is acquired during a second panning of the imaging apparatus, and the first panning and the second panning have different tilt positions of the imaging apparatus.

2. The imaging control apparatus according to claim 1, wherein the automatic imaging mode control unit changes the control setting of the variable mechanism of the imaging visual field controlled by the imaging visual field variable control unit between the automatic still image capturing and the automatic panorama image capturing.

3. The imaging control apparatus according to claim 2, wherein the imaging visual field variable control unit controls a panning mechanism associated with the imaging apparatus and serving as the variable mechanism of the imaging visual field, and wherein the automatic imaging mode control unit changes setting of a panning speed of the panning mechanism between the automatic still image capturing and the automatic panorama image capturing.

4. The imaging control apparatus according to claim 2, wherein the imaging visual field variable control unit controls a tilting mechanism associated with the imaging apparatus and serving as the variable mechanism of the imaging visual field, and wherein the automatic imaging mode control unit changes setting of the maximum tilt angle of the tilting mechanism between the automatic still image capturing and the automatic panorama image capturing.

5. The imaging control apparatus according to claim 1, wherein the automatic imaging mode control unit changes setting of a condition of a subject detection process and/or a composition process between the automatic still image capturing and the automatic panorama image capturing.

6. The imaging control apparatus according to claim 1, wherein the automatic imaging mode control unit is configured to set a condition of release timing based on whether the imaging unit is performing the automatic still image capturing or the automatic panorama image capturing.

7. The imaging control apparatus according to claim 1, wherein the automatic panorama image capturing control unit is further configured to generate the panorama image data using the plurality of image data acquired during the first panning and the second panning.

8. An imaging control method for an imaging apparatus or an imaging system which includes an imaging unit imaging a subject and a variable mechanism varying an imaging visual field among a plurality of imaging visual fields of the imaging unit, the imaging control method comprising:
   allowing the imaging apparatus or the imaging system to perform;
      an imaging process in an automatic still image capturing mode for detecting the subject while the variable mechanism varies the imaging visual field to another one of the plurality of imaging visual fields and automatically capturing a still image in response to detecting the subject, and
      an imaging process in an automatic panorama image capturing mode including detecting the subject in the imaging visual field, while the variable mechanism varies the imaging visual field to another one of the plurality of imaging visual fields, and, upon detection of the subject, acquiring a plurality of image data used to generate panorama image data while the variable mechanism varies the imaging visual field,
      wherein, in an event automatic panorama image capturing is performed,
      the variable mechanism is controlled such that a portion of one or more image data among the plurality of image data acquired during a first panning of the imaging apparatus or the imaging system is acquired during a second panning of the imaging apparatus or the imaging system, and the first panning and the second panning have different tilt positions of the imaging apparatus or the imaging system; and
      changing control setting between performing the imaging process of the automatic still image capturing mode and performing the imaging process of the automatic panorama image capturing mode.

9. A non-transitory computer-readable medium comprising processor-executable instructions which, when executed by a processor cause performance of a method for controlling an imaging apparatus or an imaging system which includes an imaging unit imaging a subject and a variable mechanism varying an imaging visual field among a plurality of imaging visual fields of the imaging unit, the method comprising:
   allowing the imaging apparatus or the imaging system to perform:
      an imaging process of an automatic still image capturing mode for detecting the subject while the variable mechanism varies the imaging visual field to another one of the plurality of imaging visual fields and automatically capturing a still image in response to detecting the subject, and
      an imaging process of an automatic panorama image capturing mode including detecting the subject in the imaging visual field, while the variable mechanism varies the imaging visual field to another one of the plurality of imaging visual field, and, upon detection of the subject, acquiring a plurality of image data used to generate panorama image data while the variable mechanism varies the imaging visual field,
      wherein, in an event automatic panorama image capturing is performed,
      the variable mechanism is controlled such that a portion of one or more image data among the plurality of image data acquired during a first panning of the imaging apparatus or the imaging system is acquired during a second panning of the imaging apparatus or the imaging system, and the first panning and the second panning have different tilt positions of the imaging apparatus or the imaging system; and
      changing control setting between performing the imaging process of the automatic still image capturing mode and performing the imaging process of the automatic panorama image capturing mode.

10. The non-transitory computer-readable medium of claim 9, wherein the method comprises changing a setting of a panning speed of a panning mechanism representing the variable mechanism in an event of changing between the automatic still image capturing mode and the automatic panorama image capturing mode.

11. The non-transitory computer-readable medium of claim 9, wherein the method comprises changing a setting of a maximum tilt angle of a tilting mechanism representing the variable mechanism in an event of changing between the automatic still image capturing mode and the automatic panorama image capturing mode.

12. The non-transitory computer-readable medium of claim 9, wherein changing the control setting comprises setting a condition of a subject detection process and/or a composition process.

13. The non-transitory computer-readable medium of claim 9, wherein the method further comprises setting a condition of release timing based on whether the imaging apparatus or the imaging system is performing the imaging process in the automatic still image capturing mode or the imaging process in the automatic panorama image capturing mode.

14. The imaging control method of claim 8, wherein the method comprises changing a setting of a panning speed of a panning mechanism representing the variable mechanism in an event of changing between the automatic still image capturing mode and the automatic panorama image capturing mode.

15. The imaging control method of claim 8, wherein the method comprises changing a setting of a maximum tilt angle of a tilting mechanism representing the variable mechanism in an event of changing between the automatic still image capturing mode and the automatic panorama image capturing mode.

16. The imaging control method of claim 8, wherein changing the control setting comprises setting a condition of a subject detection process and/or a composition process.

17. The imaging control method of claim 8, wherein the method further comprises setting a condition of release timing based on whether the imaging apparatus or the imaging system is performing the imaging process in the automatic still image capturing mode or the imaging process in the automatic panorama image capturing mode.

* * * * *